(12) United States Patent
Yamashita et al.

(10) Patent No.: US 10,349,572 B2
(45) Date of Patent: Jul. 16, 2019

(54) WORK VEHICLE TRAVEL SYSTEM

(71) Applicant: YANMAR CO., LTD., Osaka-shi, Osaka (JP)

(72) Inventors: Masaaki Yamashita, Osaka (JP); Tsuyoshi Kawakami, Osaka (JP); Daisuke Hirata, Osaka (JP)

(73) Assignee: YANMAR CO., LTD., Osaka (JP)

( * ) Notice: Subject to any disclaimer, the term of this patent is extended or adjusted under 35 U.S.C. 154(b) by 51 days.

(21) Appl. No.: 15/527,177

(22) PCT Filed: Nov. 12, 2015

(86) PCT No.: PCT/JP2015/081904
§ 371 (c)(1),
(2) Date: May 16, 2017

(87) PCT Pub. No.: WO2016/080285
PCT Pub. Date: May 26, 2016

(65) Prior Publication Data
US 2017/0318732 A1    Nov. 9, 2017

(30) Foreign Application Priority Data

Nov. 17, 2014    (JP) ................................. 2014-233177
Nov. 17, 2014    (JP) ................................. 2014-233178
Nov. 17, 2014    (JP) ................................. 2014-233179

(51) Int. Cl.
*A01B 69/00*    (2006.01)
*G01C 21/26*    (2006.01)
(Continued)

(52) U.S. Cl.
CPC ............ *A01B 69/007* (2013.01); *G01C 21/26* (2013.01); *G05D 1/02* (2013.01); *G05D 1/0295* (2013.01);
(Continued)

(58) Field of Classification Search
CPC ...... A01B 69/007; G05D 1/0295; G05D 1/02; G05D 2201/0201; G01C 21/26; G08G 1/09
See application file for complete search history.

(56) References Cited

U.S. PATENT DOCUMENTS 5,187,663 A    2/1993    Kamimura
6,148,255 A    11/2000   Van Der Lely
(Continued)

FOREIGN PATENT DOCUMENTS

JP    H03138708 A    6/1991
JP    H11282530 A    10/1999
(Continued)

OTHER PUBLICATIONS

International Search Report corresponding to Application No. PCT/JP2015/081904; dated Feb. 2, 2016.

*Primary Examiner* — Yuen Wong
(74) *Attorney, Agent, or Firm* — Norton Rose Fulbright US LLP

(57) ABSTRACT

In order to use a manned-travel work vehicle, such as a multi-purpose transport vehicle, for transporting machinery or material or for moving for the purpose of work, a rest or the like, and to cause an unmanned-travel work vehicle to reliably arrive at a destination using wireless communication, the present invention provides a work vehicle transport system. In the transport system, travel trajectory information about a travel trajectory of a first vehicle that is a manned-travel work vehicle to a work location is transmitted via wireless communication to a second vehicle, and it is determined whether the second vehicle is to perform unmanned-travel along the travel trajectory.

18 Claims, 10 Drawing Sheets

(51) Int. Cl.
    *G05D 1/02*     (2006.01)
    *G08G 1/09*     (2006.01)

(52) U.S. Cl.
    CPC ....... *G08G 1/09* (2013.01); *G05D 2201/0201* (2013.01)

(56) References Cited

U.S. PATENT DOCUMENTS

| | | |
|---|---|---|
| 9,020,682 B2 | 4/2015 | Shitamoto |
| 9,164,513 B2 | 10/2015 | Matsuzaki et al. |
| 2007/0233348 A1 | 10/2007 | Diekhans et al. |
| 2013/0166134 A1 | 6/2013 | Shitamoto |
| 2014/0277899 A1* | 9/2014 | Matsuzaki ........... G05D 1/0287 701/25 |

FOREIGN PATENT DOCUMENTS

| | | | |
|---|---|---|---|
| JP | 2000029522 A | | 1/2000 |
| JP | 2001129787 A | | 5/2001 |
| JP | 2001507843 A | | 6/2001 |
| JP | 2005176741 A | | 7/2005 |
| JP | 2009149194 A | * | 7/2009 |
| JP | 2009149194 A | | 7/2009 |
| JP | 2011011677 A | | 1/2011 |
| JP | 2012022467 A | | 2/2012 |
| JP | 2014178759 A | | 9/2014 |

* cited by examiner

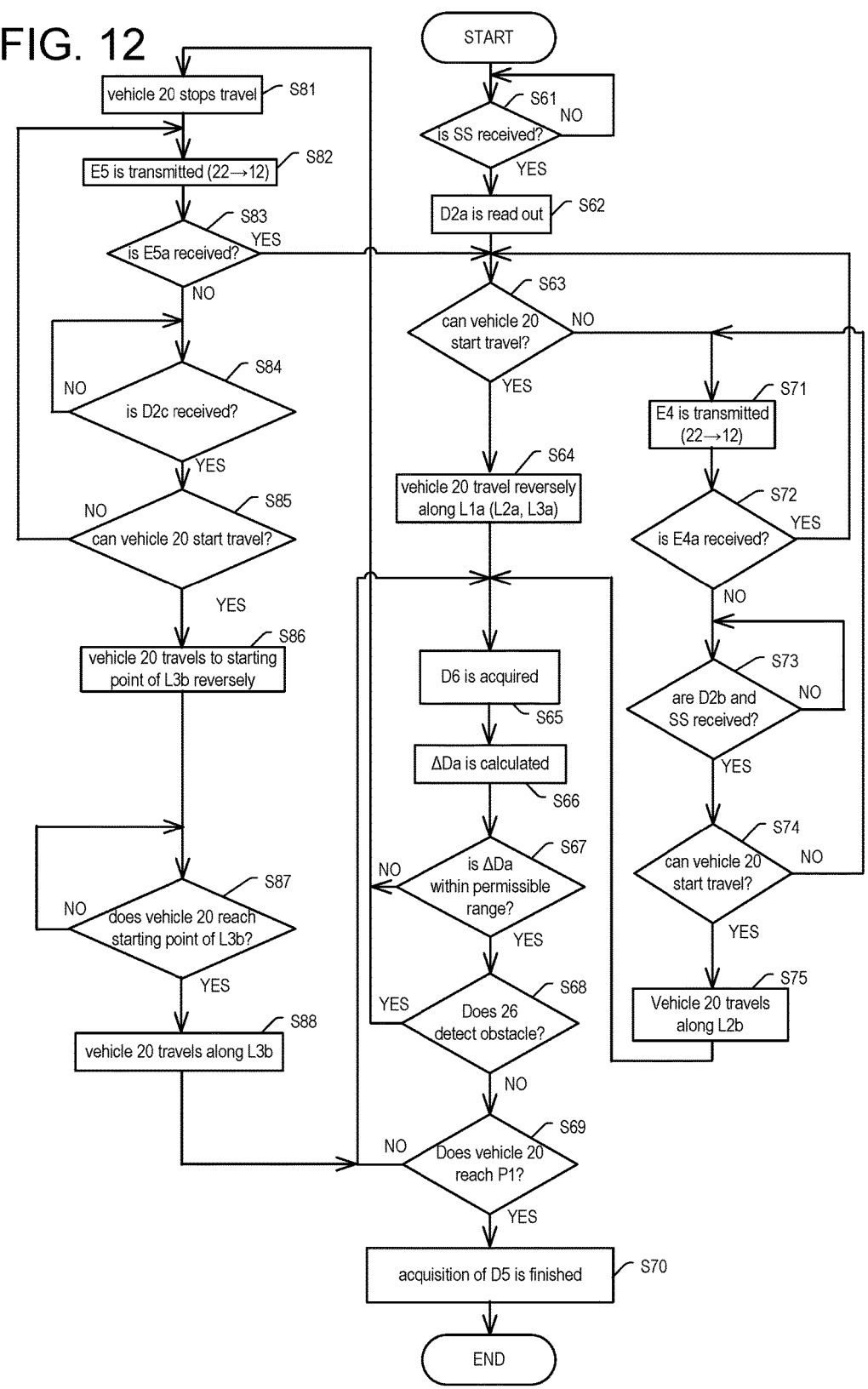

WORK VEHICLE TRAVEL SYSTEM

CROSS REFERENCE TO RELATED APPLICATIONS

This is the U.S. national stage of application No. PCT/JP2015/081904, filed on Nov. 12, 2015. Priority under 35 U.S.C. § 119(a) and 35 U.S.C. § 365(b) is claimed from Japanese Application No. JP2014-233177, filed Nov. 17, 2014, Japanese Application No. JP2014-233178, filed Nov. 17, 2014, and Japanese Application No. JP2014-233179, filed Nov. 17, 2014, the disclosure of which is also incorporated herein by reference.

TECHNICAL FIELD

The present invention relates to a travel system of a manned work vehicle and an unmanned work vehicle using a wireless communication system, especially relates to a movement system and a work system.

BACKGROUND ART

In recent, corresponding to requirement of improve of work efficiency, life style to diversify and the like, a work system of a work vehicle using wireless communication is provided. For example, as shown in the Patent Literature 1, a work system in which an unmanned slave work vehicle follows a manned master work vehicle so as to perform work such as ground work is known.

On the other hand, in recent, demand of a multipurpose truck as shown in the Patent Literature 2 is increased. While being excellent in ability to travel over off-road, uneven ground and the like, the multipurpose truck is suitable for traveling on road and can turn in a small radius, thereby being used for, for example, conveyance of machines and goods for agriculture to farmland in private land taking advantage of the travel characteristics.

Herein, for example, under movement of a manned travel work vehicle (multipurpose truck) and an unmanned travel work vehicle (tractor) between a foothold at a non-working time and a work objective position, when the art in which the unmanned travel work vehicle follows the manned travel work vehicle as shown in the Patent Literature 1 is adopted, under outward travel from the foothold at the non-working time to the work objective position, an operator on the manned travel work vehicle must check whether anything which becomes travel obstacle for the unmanned travel work vehicle exists or not during the travel, and the obstacle may be overlooked and the following unmanned travel work vehicle may contact the obstacle, whereby the operator must care about the following unmanned travel work vehicle all the time during the travel.

Concerning return travel from the work objective position to the foothold at the non-working time, for example, after a tractor or the like which is the unmanned travel work vehicle finishes work, even when the operator wants to remain at the work objective position and works with the multipurpose truck which is the manned travel work vehicle, the unmanned travel work vehicle cannot be returned previously to the foothold at the non-working time and must wait until the operator starts for home with the manned travel work vehicle. When the manned travel work vehicle start for home, the operator must care about the following unmanned travel work vehicle (tractor) all the time during the travel.

On the other hand, a mode using the unmanned travel work vehicle and the manned travel work vehicle on the work can be considered that, for example under agricultural work, the great portion of the work is performed by unmanned travel of the tractor or the like and the operator itself operates a vehicle with high travel flexibility by manned travel so as to perform auxiliary work. For realizing the mode using both the vehicles, under the work, firstly, a work travel route of the unmanned travel work vehicle must be demarcated. In this case, when the art disclosed in the Patent Literature 1 is used, only for demarcating the work travel route of the unmanned travel work vehicle, the manned travel work vehicle must travel on a route which is to be the work travel route everywhere.

PRIOR ART REFERENCE

Patent Literature

Patent Literature 1: the Japanese Unexamined Patent Publication 2001-507843
Patent Literature 2: the Japanese Patent Laid Open Gazette 2011-11677

DISCLOSURE OF INVENTION

Problems to Be Solved by the Invention

The first purpose of the present invention is to provide a movement system of a work vehicle using a wireless communication system for securing usage of a manned travel work vehicle with high flexibility whose purpose is conveyance of machines and goods, work, a break, outward and return movement and the like, and ensuring unmanned travel of an unmanned travel work vehicle.

The first purpose of the present invention is to provide a work system of the work vehicle using the wireless communication system for ensuring the unmanned travel of the unmanned travel work vehicle and improve travel flexibility of the manned travel work vehicle.

Means for Solving the Problems

The first mode of the present invention is a system of movement control of work vehicles having a first vehicle which is a manned travel work vehicle and a second vehicle which is an unmanned travel work vehicle configured so as to attain the first purpose. In the system of movement control, a wireless communication system which enables transmission of information between the first vehicle and the second vehicle is configured. The second vehicle receives travel trajectory information concerning a travel trajectory of the first vehicle and a state thereof by the wireless communication system, and performs unmanned operating travel to an objective position along the travel trajectory of the first vehicle based on the travel trajectory information. Whether the unmanned operating travel of the second vehicle is started or suspended is judged based on the travel trajectory information, and when suspended, travel suspension information which is information concerning a cause of travel suspension is transmitted to the first vehicle by the wireless communication system.

Differential information is calculated from information concerning an actual position acquired by the second vehicle, a state of the second vehicle and a circumference thereof and the travel trajectory information of the first vehicle, and whether the unmanned operating travel is continued or stopped is judged based on the differential information, and when the travel is stopped, travel stop information which is information concerning a travel stop position and a travel stop cause is transmitted to the first vehicle by the wireless communication system.

The second vehicle can acquire alternative travel trajectory information concerning an alternative travel trajectory of the first vehicle or the second vehicle to the objective position and a state thereof in addition to the travel trajectory information, and can select the alternative travel trajectory and perform unmanned operating travel along the selected alternative travel trajectory to the objective position.

A portable information terminal which enables transmission and reception of information by using the wireless communication system is provided in the first vehicle.

The second mode of the present invention is a system of movement control having a first vehicle which is a manned travel work vehicle and a second vehicle which is an unmanned travel work vehicle configured so as to attain the first purpose. In the movement system, a wireless communication system which enables transmission of information between the first vehicle and the second vehicle is configured. The second vehicle receives first travel trajectory information concerning a first travel trajectory of the first vehicle and a state thereof by the wireless communication system and performs unmanned operating travel along the first travel trajectory based on the first travel trajectory information, and receives second travel trajectory information concerning a second travel trajectory of the second vehicle and a state thereof and performs unmanned operating travel reversely along the second travel trajectory based on the second travel trajectory information.

Differential information is calculated from information concerning an actual position and a state of the second vehicle and a circumference thereof acquired under the unmanned operating travel reversely along the second travel trajectory of the second vehicle and the second travel trajectory information, and whether the unmanned travel is continued or stopped is judged based on the differential information, and when the travel is stopped, travel stop information which is information concerning a travel stop position and a travel stop cause is transmitted to the first vehicle by the wireless communication system.

The second vehicle can acquire alternative travel trajectory information concerning an alternative travel trajectory of the first vehicle or the second vehicle reversely along the second travel trajectory to the objective position of the unmanned position and a state thereof in addition to the first travel trajectory information and the second travel trajectory information, and can select the alternative travel trajectory and perform unmanned operating travel along the selected alternative travel trajectory based on the alternative travel trajectory information.

A portable information terminal which enables transmission and reception of information by using the wireless communication system is provided in the first vehicle.

The third mode of the present invention is a work system using a first vehicle which is a manned travel work vehicle and a second vehicle which is an unmanned travel work vehicle configured so as to attain the second purpose. In the work system, a wireless communication system which enables transmission of information between the first vehicle and the second vehicle is configured. The second vehicle receives travel trajectory information concerning a travel trajectory of the first vehicle by the wireless communication system, the travel trajectory of the first vehicle demarcates a boundary of a work area based on the travel trajectory information, a work travel route of the second vehicle in the work area is calculated, and work travel can be performed unmannedly along the calculated work travel route.

In the work system, one or more processing points in the work travel route are calculated and information concerning the processing points is transmitted from the second vehicle to the first vehicle by the wireless communication system.

In the work system, when the second vehicle stops the travel, information concerning a stop position and a cause of the stop is transmitted from the second vehicle to the first vehicle by the wireless communication system.

A portable information terminal which enables transmission and reception of information by using the wireless communication system is provided in the first vehicle.

Effect of the Invention

In the system of movement control according to the first mode, an operator selects optionally a work objective position and a travel route to the work objective position in consideration of target contents of work, weather, road state of the day and the like and travels from a foothold at a non-working time to the work objective position actually by manned travel so as to confirm whether the route is suitable for the second vehicle which is operated unmannedly or not before start of the unmanned second vehicle. After the confirmation, the travel trajectory information is transmitted to the second vehicle by using the wireless communication system. Accordingly, the travel trajectory information received by the second vehicle is formed in consideration of travel state of the second vehicle. Furthermore, based on the travel trajectory information received accordingly, start or suspension of start of unmanned operating travel of the second vehicle along the travel trajectory of the first vehicle is judged, whereby the unmanned operating travel of the second vehicle which cannot be looked by the operator is performed after two confirmations, that is, confirmation by the operator itself traveling mannedly the first vehicle and confirmation based on the travel trajectory information. On the other hand, even if the operator operating the first vehicle misses check whether the travel trajectory of the first vehicle is suitable for the second vehicle or not, the travel start or suspension is judged in the second vehicle, whereby the operator can operate the first vehicle comfortably and flexibly. When the second vehicle does not start the travel, the operator can grasp the state thereof and a cause of travel suspension by travel suspension information transmitted to a first transmission reception means. Accordingly, when the cause can be removed, the operator removes it so as to promote start of travel of the second vehicle, and when the cause cannot be removed, the unmanned operating travel of the second vehicle is switched to travel along another travel trajectory.

Under the unmanned operating travel of the second vehicle along the travel trajectory of the first vehicle, the information concerning the actual position and a state thereof is acquired, and based on differential information between the acquired information and the travel trajectory information, continue or stop of the unmanned operating travel is judged. Accordingly, even if the travel trajectory information includes the travel suspension cause which cannot be distinguished by the check before starting the travel or a travel prevention cause (mudslide or the like) which does not exist at the time of generating the travel trajectory information (that is, under the travel of the first vehicle) is generated later, when the second vehicle reaches to a point at which the cause exists, it is judged that the travel should be stopped there. Accordingly, certain autonomous travel of the second vehicle under the unmanned operating travel which cannot be looked by the operator is secured.

As mentioned above, the second vehicle can acquire the alternative travel trajectory information concerning the alternative travel trajectory and the state thereof, and can select the alternative travel trajectory and perform the unmanned operating travel along the selected alternative travel trajectory to the destination. Accordingly, in the case in which the travel of the second vehicle is suspended or stopped, when the operator cannot remove the cause of suspension or stop of the travel even by going to the point at which the cause occurs by the first vehicle, the travel trajectory selected as the above is set to the alternative travel trajectory and the second vehicle can move to the destination by traveling along the alternative travel trajectory. Namely, certainty of arrival of the second vehicle to the destination such as the work objective position is improved.

By providing the portable information terminal which enables transmission and reception of information by using the wireless communication system in the first vehicle, convenience of the operator is improved. Namely, transmission of the travel trajectory information can be performed at a position separated from the first vehicle, reception of the travel suspension information or the travel stop information of the second vehicle can be grasped at the time of work or break while being separated from the first vehicle, and furthermore, when the travel trajectories are stored in the portable information terminal, the route selection of the second vehicle can be performed immediately at the time of grasping reception of the travel suspension information or the travel stop information. As the portable terminal, a tablet type portable information terminal can be used. Since an actual position detection means such as GPS is included in many of such portable information terminals, only by attaching or carrying the terminal in the first vehicle, the terminal can serve as means for detecting the actual position of the first vehicle, whereby cost can be reduced in comparison with the case in which the actual position detection means is provided separately.

In the travel system according to the second mode, based on the first travel trajectory information, under the outward unmanned travel along the first travel trajectory, information such as the actual position is acquired and accumulated in the second vehicle, whereby the second travel trajectory information concerning the travel trajectory of the outward travel of the second vehicle itself and the state thereof is generated and used effectively for the return trajectory of the second vehicle. Namely, under the outward travel, the information acquired in the travel is different in the first vehicle and the second vehicle which are different in size, travel posture and the like, and even when the second vehicle travels along the first travel trajectory, the differential information between the acquired information of the first vehicle and the acquired information of the second vehicle must be analyzed so as to travel. Under the return travel, since the course is contrary to the unmanned travel, the gap which causes any problem in the outward travel may be difficult to be got over, and such difference must be considered between the information acquired in the outward travel and the information acquired in the return travel. Moreover, between the information concerning the travel trajectory of the outward travel of the first vehicle and the state thereof and the information acquired in the return travel of the second vehicle, the difference is increased, whereby the right judgment whether the return travel is continued or not (or started or not) is difficult. Then, though the difference of the opposite travel should be considered, when the travel is performed reversely along the travel trajectory of the outward travel of the second vehicle, the difference between the second travel trajectory information of the outward travel and the information acquired in the return travel of the second vehicle is reduced, whereby accuracy of the judgement of permission or disapproval of continue of the travel is improved. Accordingly, by ensuring the unmanned return travel of the second vehicle, for example, after the unmanned second vehicle finishes the work, when the operator wants to remain at the work objective position and works with the first vehicle, the second vehicle is returned to the foothold at the non-working time previously by the unmanned travel and the operator can start for home by operating the first vehicle without caring the second vehicle at the time of finishing the work.

Under the unmanned travel reversely along the second travel trajectory of the second vehicle, the information concerning the actual position and the state thereof is acquired, and continue or stop of the unmanned travel is judged based on the differential information between the acquired information and the travel trajectory information. Accordingly, even if the travel trajectory information includes the travel suspension cause which cannot be distinguished by the check before starting the travel or a travel prevention cause (mudslide or the like) which does not exist at the time of generating the travel trajectory information (that is, under the travel of the first vehicle) is generated later, when the second vehicle reaches to a point at which the cause exists, it is judged that the travel should be stopped there. Accordingly, certain autonomous travel of the second vehicle under the unmanned operating travel which cannot be looked by the operator is secured.

As mentioned above, the second vehicle can acquire the alternative travel trajectory and the alternative travel trajectory information, and can select the alternative travel trajectory and travel unmannedly along the selected alternative travel trajectory. Accordingly, in the case in which the travel of the second vehicle is suspended or stopped, when the operator cannot remove the cause of suspension or stop of the travel even by going to the point at which the cause occurs by the first vehicle, the travel trajectory selected as the above is set to the alternative travel trajectory and the second vehicle can move to the destination by traveling along the alternative travel trajectory. Namely, certainty of arrival of the second vehicle to the destination such as the work objective position is improved.

By providing the portable information terminal which enables transmission and reception of information by using the wireless communication system in the first vehicle, convenience of the operator is improved. Namely, transmission of the travel trajectory information can be performed at a position separated from the first vehicle, reception of the travel suspension information or the travel stop information of the second vehicle can be grasped at the time of work or break while being separated from the first vehicle, and furthermore, when the travel trajectories are stored in the portable information terminal, the route selection of the second vehicle can be performed immediately at the time of grasping reception of the travel suspension information or the travel stop information. As the portable terminal, a tablet type portable information terminal can be used. Since an actual position detection means such as GPS is included in many of such portable information terminals, only by attaching or carrying the terminal in the first vehicle, the terminal can serve as means for detecting the actual position of the first vehicle, whereby cost can be reduced in comparison with the case in which the actual position detection means is provided separately.

In the work system according to the third mode, at the time of determining the work travel route of the second vehicle, the travel of the first vehicle operated by the operator is required only on a line assumed as a boundary of the work area of the second vehicle, and the work travel route is determined superficially so as to occupy the work area surrounded by the boundary by calculation process of the calculation means of the second vehicle performing the work travel along the work travel route. Accordingly, the time and distance for the operator to travel the first vehicle are shortened so as to reduce labor, whereby free time which is not restrained by the work of the second vehicle can be increased.

As mentioned above, the processing point in the work travel route of the second vehicle of the unmanned operation is set and the information thereof is transmitted from the second vehicle to the first vehicle. Accordingly, the operator can operate the first vehicle and travel around one or more set processing points so as to perform efficient work. For example, the case can be considered that the tractor equipped with a digging machine which is the second vehicle sets one or more processing points as points at which a multipurpose truck which is the first vehicle waits in a post process while performing the work travel of digging up subterranean crops. In this case, in the first vehicle of the manned operation, by receiving information concerning the processing points, the operator can grasp all the calculated processing points, thereby traveling around the set points and working efficiently while operating the first vehicle used for collecting and loading the dug-up crops. The processing points are set so as to make the processing work by the operator with the first vehicle efficient. For example, when the operator collects the dug-up crops and loads them to a container along the trajectory of the work travel of the second vehicle, the container is filled up with the crops just at the processing point, and the multipurpose truck which is the first vehicle waits at the processing point so that the container filled up with the crops can be loaded to a cargo bed of the multipurpose truck there without conveying the container for long distance. Accordingly, the load of work with the manned travel work vehicle is reduced.

As mentioned above, when the situation in which the work travel route of the second vehicle of the unmanned operation should be stopped occurs and the travel is stopped, the information thereof is transmitted from the second vehicle to the first vehicle. Accordingly, even if the operator cannot look the second vehicle of the unmanned operation, by receiving the information, the operator can know the fact of travel stop, the stop position and the cause of the second vehicle and can perform suitable treatment. For example, while the second vehicle performs the seeding or fertilizing work, when seed of the seed hopper or fertilizer of the fertilizer tank is run out, the second vehicle stops the travel at the point at which the run out of seed or fertilizer occurs, information notifying the stop position and the purport that the cause of the stop is the run out of seed or fertilizer is transmitted from the second transmission reception means to the first transmission reception means, and the operator at a standby place knows the contents of the information by reception of the first transmission reception means, conveys spare seed or fertilizer to the stop position by the first vehicle, and feeds the seed or fertilizer to the second vehicle stopped at the stop position. Otherwise, when the second vehicle is stopped by the cause which is not assumed on work, such as engine trouble or the gap over which the second vehicle cannot get, the operator can grasp the fact of travel stop of the second vehicle, the stop position and the cause thereof even when leaving from the work objective position and taking a rest, go to the travel stop position and perform suitable treatment. For example, in the case in which the cause of the travel stop is the gap as mentioned above, when an image acquisition means (camera) is provided in the second vehicle, image information of the gap is acquired and received by the first transmission reception means. Accordingly, the operator can grasp the face that the cause of the travel stop is the gap and the visual state of the gap, and for example, can go to the travel stop position by the first vehicle while loading a shovel for flattening the gap on the first vehicle.

By providing the portable information terminal which enables transmission and reception of information by using the wireless communication system in the first vehicle, convenience of the operator is improved. For example, transmission of the travel trajectory information of the first vehicle to the second transmission reception means for demarcating the boundary of the work area of the second vehicle can be performed at a position separated from the first vehicle, and reception of information concerning the processing point or the travel stop of the second vehicle can be grasped at the time of work or break while being separated from the first vehicle.

BRIEF DESCRIPTION OF DRAWINGS

FIG. 12 is a flow chart of return travel control of the unmanned travel work vehicle.

DETAILED DESCRIPTION OF THE INVENTION

Figure 1:
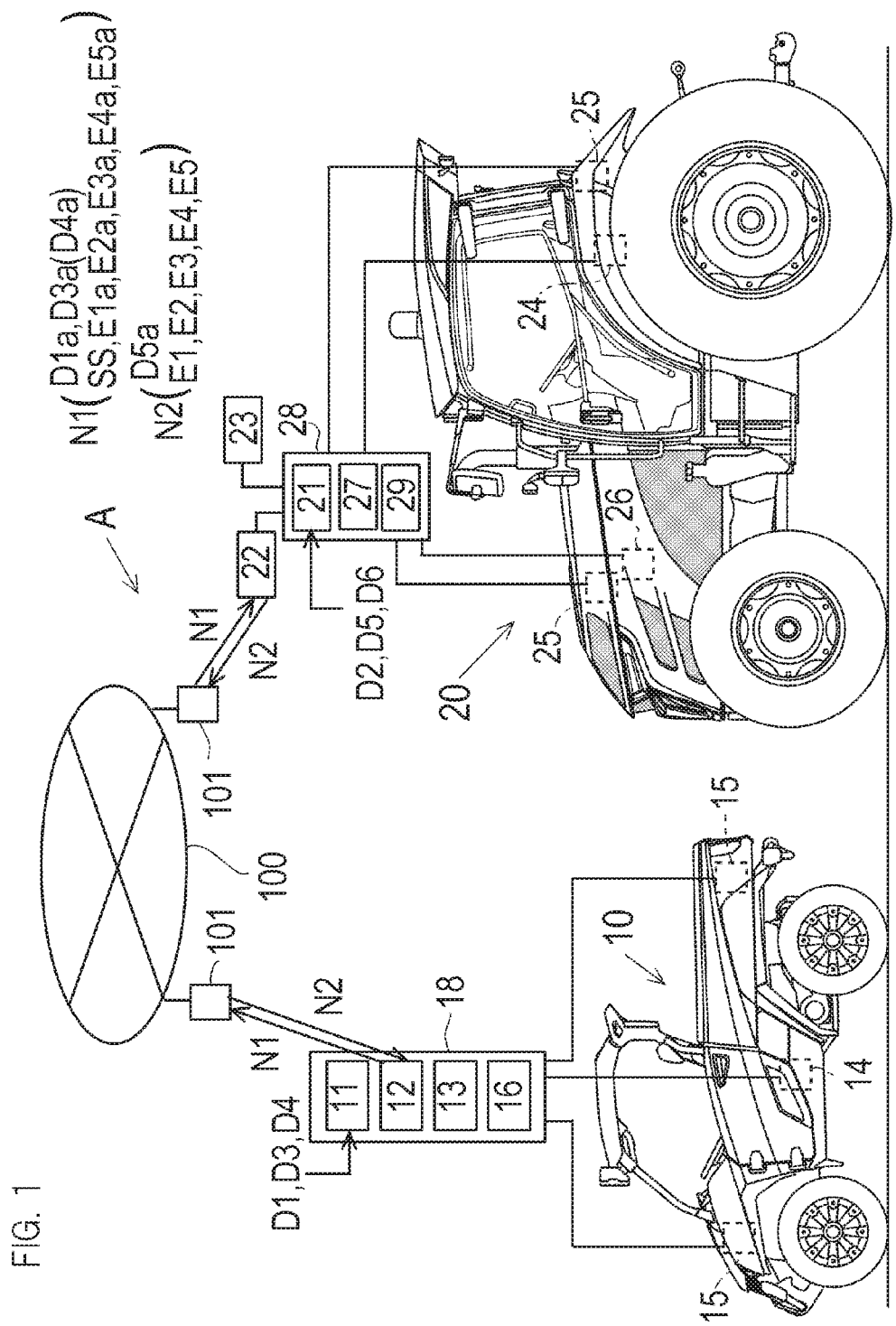
FIG. 1 is a block drawing of configuration of a travel work system of a manned travel work vehicle and an unmanned travel work vehicle with a wireless communication system according to an embodiment.

<1. Outline of System>
<1-1. Elements of System>
Referring to FIGS. 1 and 2, a travel work system according to the present invention is explained. The travel work system is a movement system with wireless communication used for movement of a first vehicle 10 which is a manned travel work vehicle traveling by operation of an operator and a second vehicle 20 which is an unmanned travel work vehicle between a foothold at a non-working time (first point P1 discussed later) and a work objective position (second point P2 discussed later), and a work system with wireless communication used for work at the work objective position with the first vehicle 10 and the second vehicle 20. The second vehicle 20 has a controller 28 for automatic travel, and the second vehicle 20 travels unmannedly by automatic control of the controller 28. In this embodiment, the first vehicle 10 is a multipurpose truck and the second vehicle 20 is an agricultural tractor.

The first vehicle 10 has a storage means 11 storing various information and a transmission reception means 12 for transmission and reception of the information with wireless communication, and the second vehicle 20 has a storage means 21 storing various information and a transmission reception means 22 for transmission and reception of the information with the wireless communication. The transmission and reception of the information can be performed between the transmission reception means 12 and 22 with the wireless communication. In this embodiment, as discussed in detail later, an information signal N1 (for example, a travel start command SS, travel trajectory information D1a, D3a, D4a, problem solution information E1a, E2a, E4a, E5a discussed later) is transmitted from the transmission reception means 12 of the first vehicle 10 to the transmission reception means 22 of the second vehicle 20, and an information signal N2 (for example, processing point information D5a, travel suspension information E1, E4, travel stop information E2, E3, E5 discussed later) is transmitted from the transmission reception means 22 of the second vehicle 20 to the transmission reception means 12 of the first vehicle 10.

Figure 2:
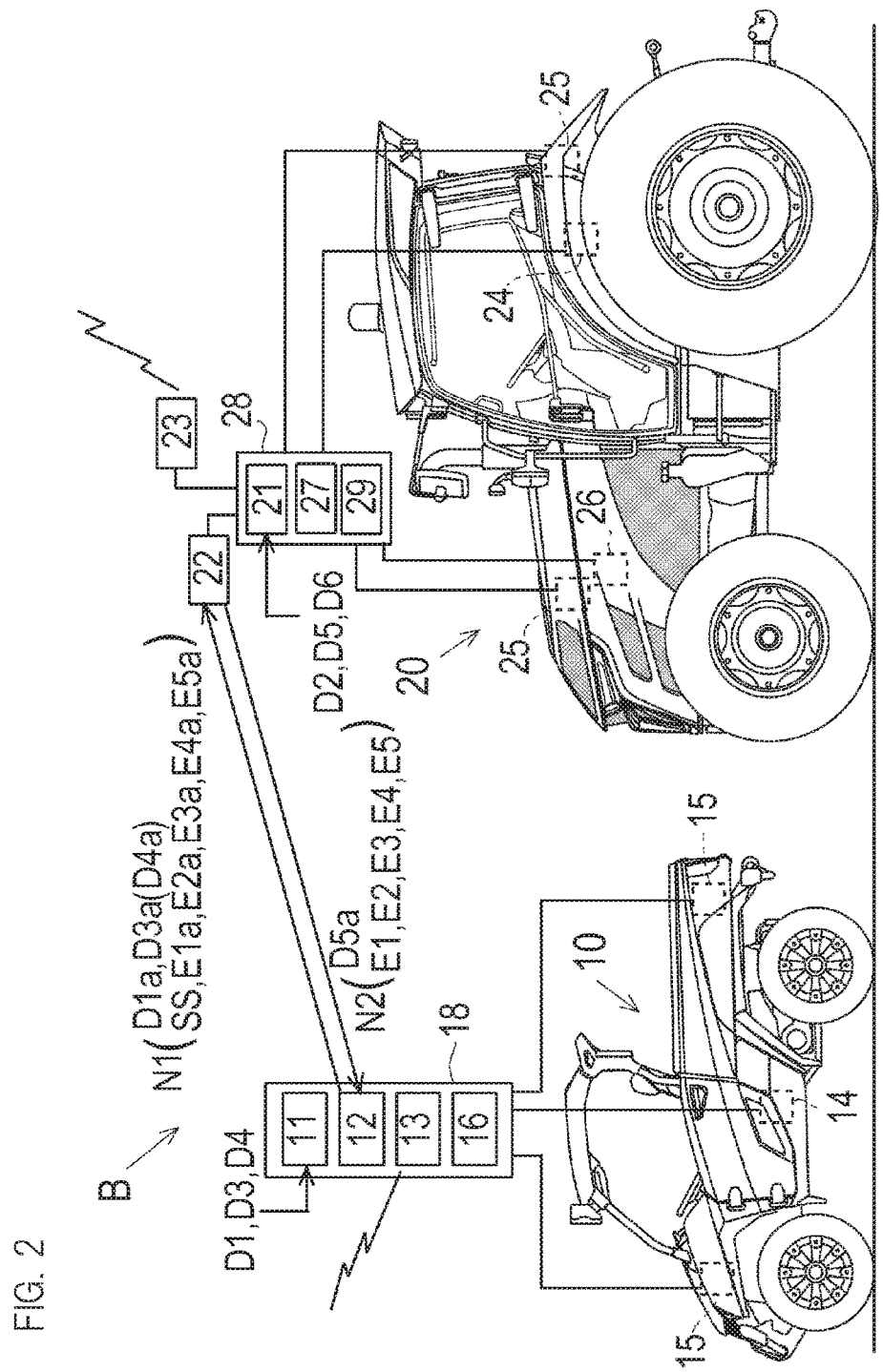
FIG. 2 is a block drawing of configuration of the travel work system of the manned travel work vehicle and the unmanned travel work vehicle with the wireless communication system according to another embodiment.

As a wireless communication system enabling transmission and reception of the information signals N1 and N2 between the transmission reception means 12 and 22, as shown in FIG. 1, a wireless communication system A in which the transmission and reception of the information signals N1 and N2 therebetween are performed via a wireless communication antenna 101 connected to a network 100 may be configured. Otherwise, as shown in FIG. 2, a wireless communication system B in which the transmission and reception of the information signals N1 and N2 are performed directly between the transmission reception means 12 and 22 may be configured. The network 100 in the wireless communication system A may be connected to a management server and manage information such as travel trajectory of the first vehicle 10 and the second vehicle 20, or may alternatively be used for controlling remotely the second vehicle 20.

In this embodiment, a portable information terminal 18 such as a tablet terminal device is detachably attached to the first vehicle 10, and the portable information terminal 18 includes the storage means 11 and the transmission reception means 12. The operator riding on the first vehicle 10 can operate the storage means 11 and the transmission reception means 12 of the portable information terminal 18 attached to the first vehicle 10, and the operator getting down from the first vehicle 10 can carry the detached portable information terminal 18 and operate the storage means 11 and the transmission reception means 12. As discussed in detail later, the portable information terminal 18 includes an actual position detection means 13 using GPS function. By using touch panel function, the portable information terminal 18 can be used as a route selection means 16 discussed later.

As means for acquiring information to be stored in the storage means 11, the first vehicle 10 has the actual position detection means 13, an inclination detection means 14 detecting an inclination state of the vehicle, and an image acquisition means 15 recognizing a state around the first vehicle 10. Similarly, as means for acquiring information to be stored in the storage means 21, the second vehicle 20 has the actual position detection means 23, an inclination detection means 24 detecting an inclination state of the vehicle, and an image acquisition means 25 recognizing a state around the second vehicle 20. Information detected and acquired by the actual position detection means 13, the inclination detection means 14 and the image acquisition means 15 of the first vehicle 10 is stored in the storage means 11 and can be transmitted from the transmission reception means 12 to the transmission reception means 22 of the second vehicle 20. In the second vehicle 20, information detected and acquired by the actual position detection means 23, the inclination detection means 24 and the image acquisition means 25 is stored in the storage means 21 and can be transmitted from the transmission reception means 22 to the transmission reception means 12 of the first vehicle 10.

As the actual position detection means 13 and 23, for example, a GPS (global positioning system) can be considered. In this embodiment, the portable information terminal 18 of the first vehicle 10 has GPS function as the actual position detection means 13. As the inclination detection means 14 and 24, a means detecting a pitch angle, a roll angle and a yaw angle of each of the first vehicle 10 and the second vehicle 20 (for example, an angle sensor) can be considered. By the inclination detection, for example, a vibration state of the vehicle occurring in the case in which uneven degree of a road surface is large can be detected. As the image acquisition means 15 and 25, for example, as shown in the drawing, it can be considered that digital cameras are attached to front and rear parts of the first vehicle 10 and the second vehicle 20. It can be considered that the pair of left and right image acquisition means 15 and 25 are provided in the front and rear parts of the first vehicle 10 and the second vehicle 20.

The first vehicle 10 and the second vehicle 20 respectively detect the actual positions (acquire information of actual positions) with the actual position detection means 13 and 23, detect the inclination state of the first vehicle 10 and the second vehicle 20 for every detected actual positions with the inclination detection means 14 and 24, and acquire images around the first vehicle 10 and the second vehicle 20 for every detected actual positions with the image acquisition means 15 and 25. By accumulating detection signals of the actual positions in the storage means 11 and 21, the travel trajectories of the first vehicle 10 and the second vehicle 20 are stored respectively in the storage means 11 and 21. Signals detected and acquired in the inclination detection means 14 and 24 and the image acquisition means 15 and 25 are accumulated, and information concerning the state of the trajectories as travel roads is stored in the storage means 11 and 21.

Furthermore, in this embodiment, an obstacle detection means 26 is provided in the second vehicle 20 and detection information thereof is stored in the storage means 21. As the obstacle detection means 26, a contact sensor, an infrared sensor or the like can be considered. As information which should be grasped and stored as the state of the trajectories along which the first vehicle 10 and the second vehicle 20 travel, in addition to the above, for example, air temperature, engine temperature, engine load and the like can be considered.

It can be considered that wireless LAN in the vehicles is built in the first vehicle 10 and the second vehicle 20 respectively by using the transmission reception means 12 and 22 for wireless communication, and for example, in the first vehicle 10, information acquired by information acquisition means such as the image acquisition means 15 is transmitted to the transmission reception means 12 by the wireless communication and stored in the storage means 11, and the information acquisition means such as the image acquisition means 15 is ordered from a controller of the portable information terminal 18 via the transmission reception means 12. The second vehicle 20 is configured similarly.

Furthermore, among the first vehicle 10 and the second vehicle 20, at least in the second vehicle 20, a judgment means 27 is provided which judges whether travel should be started or suspended or whether the travel should be continued or stopped based on the information acquired by the actual position detection means 23, the inclination detection means 24 and the image acquisition means 25 of itself and the information from the transmission reception means 12 of the first vehicle 10 received by the transmission reception means 22. In this embodiment, the judgment means 27 is provided in the second vehicle 20 as the controller 28 integrated with the storage means 21, and based on the judgment, the controller 28 turns on and off the engine and controls a clutch and a brake so as to control the travel of the second vehicle 20. Furthermore, the controller 28 has a calculation means 29, and in the calculation means 29, as mentioned later, a calculation process for finding a work travel route within a boundary of a work area demarcated by the first vehicle 10 and a calculation process for specifying a processing point P3 are performed.

<1-2. Application Conditions>

As a first application condition of the travel work system mentioned above, the first point P1 which is the foothold at the non-working time is set. As a second application condition of the system, the operator operating the first vehicle 10 can select optionally the second point P2 which is the work objective position from several different points.

Figure 3:
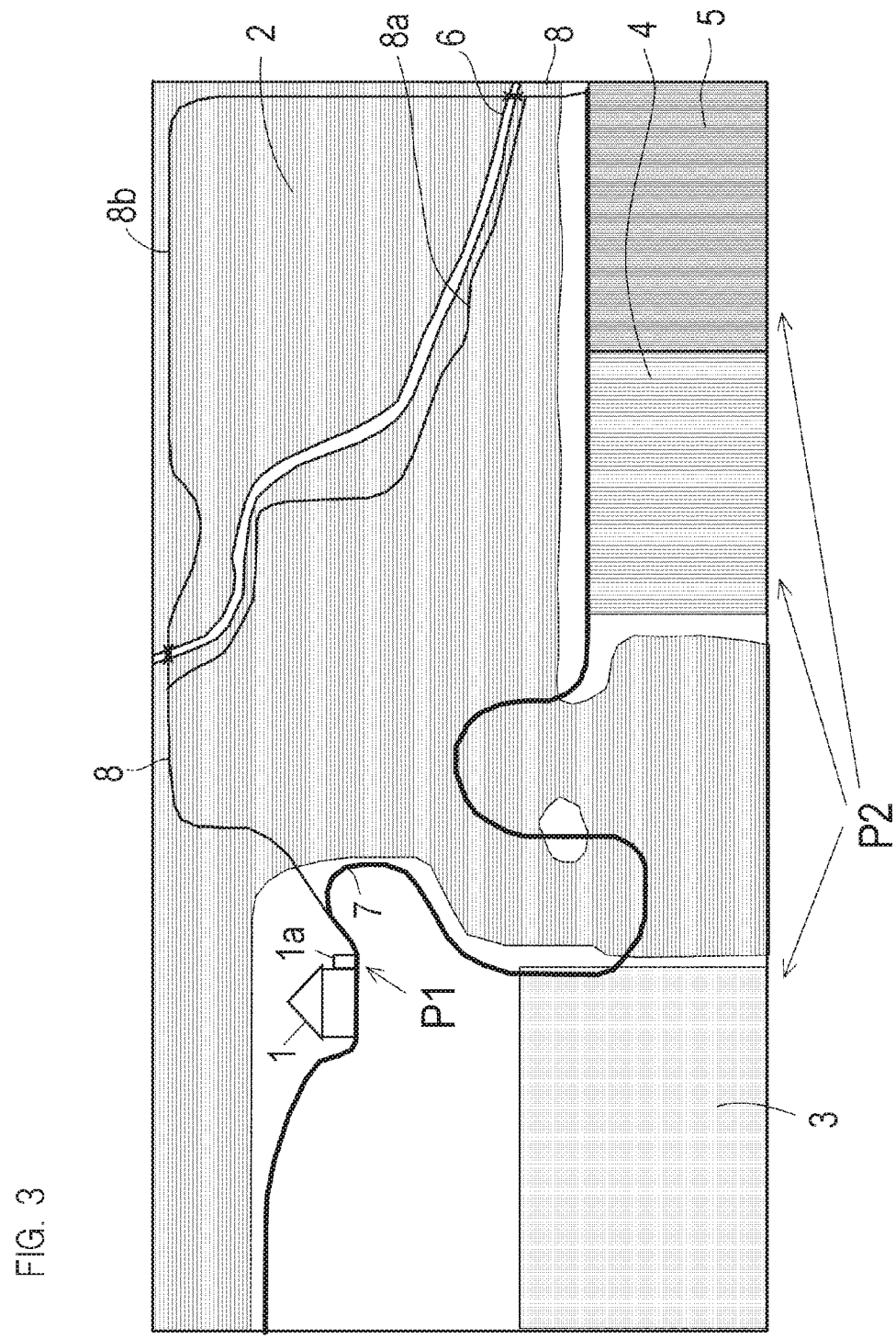
FIG. 3 is an image drawing of a ground of a farmhouse as an application example of the travel work system.
Figure 4:
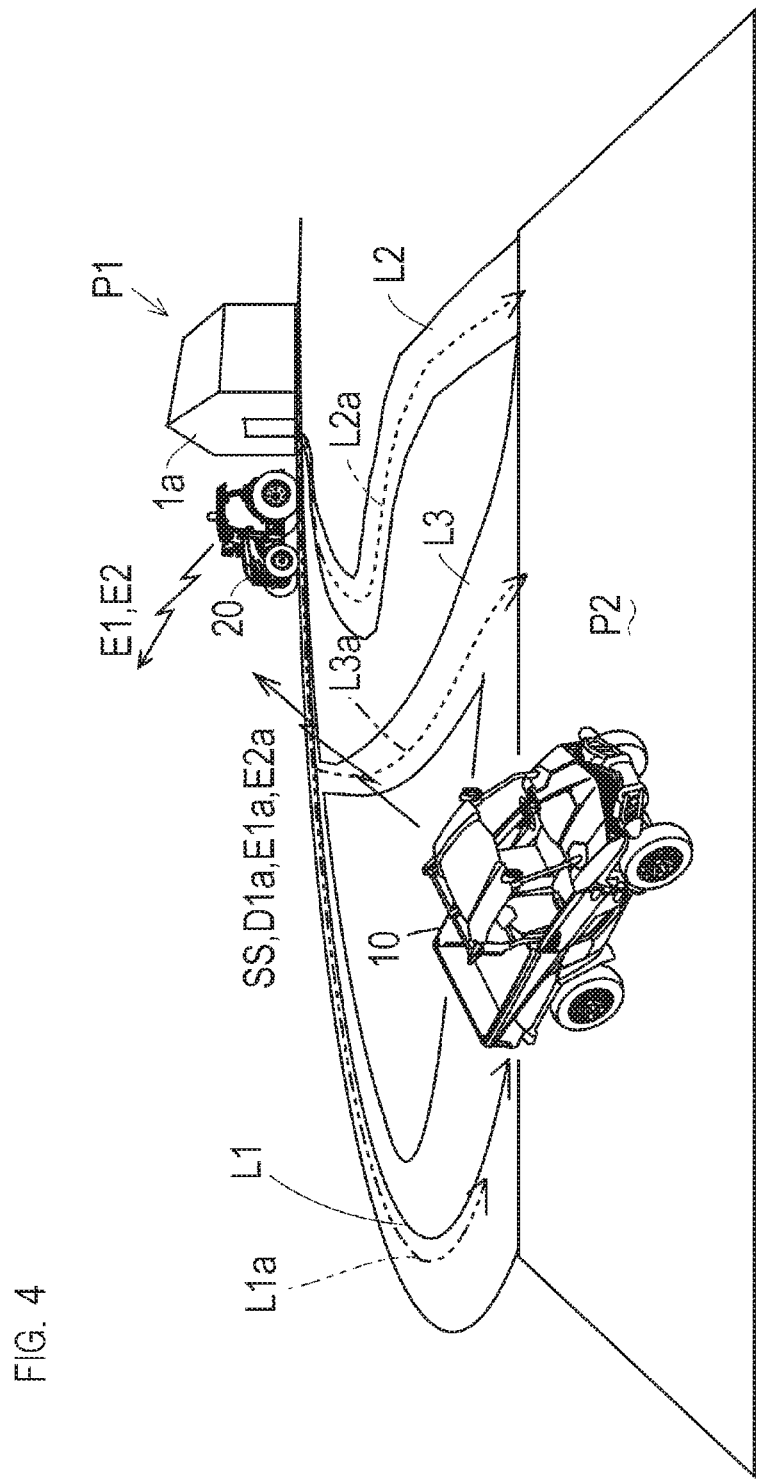
FIG. 4 is an image drawing of outward travel to a work objective position of the manned travel work vehicle and the unmanned travel work vehicle.

FIG. 3 illustrates a private land (site) of the operator using the system as a concrete embodiment in which the first point P1 and the second point P2 which are the application conditions of the system are set. In the private land, a house 1 in which the operator resides exists, and a warehouse 1a in which an agricultural machine and the like are housed is provided adjacently to the house 1. Around the house 1, while areas natural still such as forest 2 and river 6 spread out, work grounds for the operator such as a grazing ground 3, a corn cultivation ground 4 and a potato cultivation ground 5 are provided. In the site, a main road 7 passing through the front of the house 1 is provided, and by the road, the grazing ground 3, the corn cultivation ground 4 and the potato cultivation ground 5 can be accessed from the house 1. At a middle of the main road 7, a detour 8 passing through the forest 2 is branched. The detour 8 is branched into two fork roads 8a and 8b at the middle, the fork roads join as the detour 8 again, and the detour joins with the main road 7 at the front of the potato cultivation ground 5 which is the most distant work ground from the house 1.

In the warehouse 1a, the first vehicle 10 and the second vehicle 20 at the non-working time are housed. At least as mentioned later, when a requirement that the second vehicle 20 traces the travel trajectories of the first vehicle 10 can be satisfied, it can be considered that different positions are set respectively as the first point P1 for the first vehicle 10 and the first point P1 for the second vehicle 20. For example, it can be considered that the first vehicle 10 is housed in the warehouse 1a adjacent to the house 1 and the second vehicle 20 is housed in another warehouse provided at a position between the warehouse 1a and the grazing ground 3.

The operator selects the work objective position of the day from the work grounds 3, 4, and 5, and operates the first vehicle 10 and goes to the selected work objective position. Accordingly, the work objective position selected from the work grounds 3, 4, and 5 is the second point P2 of the day. The operator may select a position in the forest 2 as the second point P2 which is the work objective position so as to gather firewood. It may alternatively be considered that the second point P2 is a point to which the operator goes for the first time.

<2. Outward Movement System (Outward Travel to Work Objective Position)>

Figure 5:
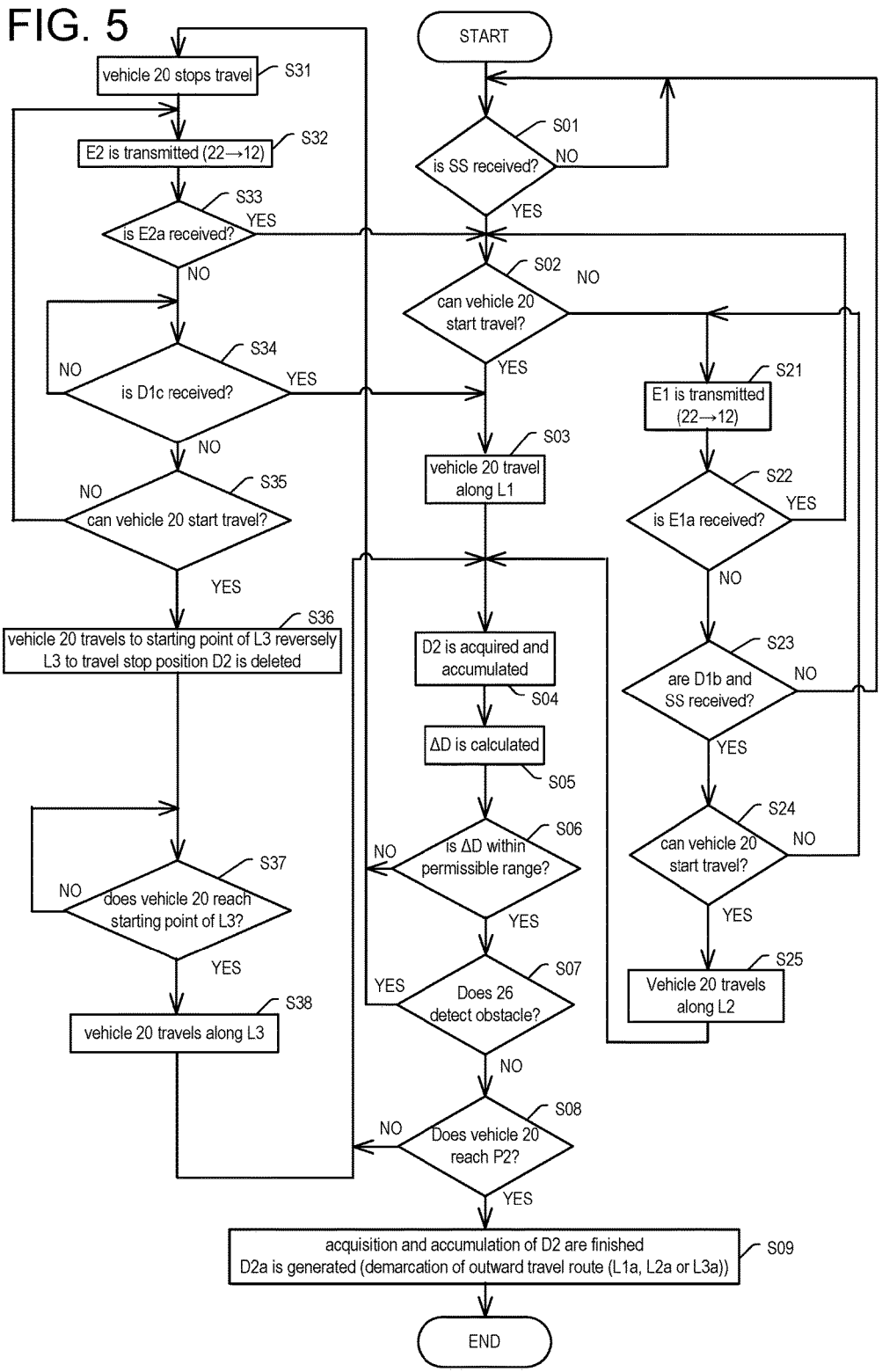
FIG. 5 is a flow chart of outward travel control of the unmanned travel work vehicle.

How the travel work system mentioned above functions as an outward movement system in outward travel of the first vehicle 10 and the second vehicle 20 to the work objective position is explained referring to an outward travel control flow chart of the second vehicle 20 in FIG. 5 while seeing image drawings in FIGS. 1, 2, 3 and 4.

<2-1. Outward Travel to Work Objective Position by First Vehicle 10>

Firstly, the operator selects the second point P2 which is the work objective position, and rides on the first vehicle 10 actually at the first point P1 and operates the first vehicle 10 so as to travel to the second point P2. During the travel of the first vehicle 10 from the first point P1 to the second point P2, the information is acquired from the actual position detection means 13, the inclination detection means 14 and the image acquisition means 15 as mentioned above (the information acquired from these means is referred synthetically to as "information D1"), and the information D1 is accumulated in the storage means 11 (step S02). During the manned travel of the first vehicle 10, the actual position detection means 13 acquires the actual position information. The inclination detection means 14 and the image acquisition means 15 as the information acquisition means acquiring information concerning a state of the first vehicle 10 and a state around the first vehicle 10 acquire inclination state information of the first vehicle 10 and image information around the first vehicle 10. The inclination state information and the image information are related with each of the actual position information, that is, regarded as information of the inclination state of the first vehicle 10 and the image information around the first vehicle 10 at each actual position. The actual position information, and the inclination state information and the image information related with the actual position information are accumulated in the storage means 11 as the information D1.

When the first vehicle 10 reaches the second point P2, the acquisition and accumulation of the information D1 with the actual position detection means 13, the inclination detection means 14 and the image acquisition means 15 are finished (step S04). The accumulation of the detection signal from the actual position detection means 13 in the storage means 11 so far is a travel trajectory L1 of the first vehicle 10 from the first point P1 to the second point P2. The accumulation of the detection signal from the inclination detection means 14 and the accumulation of the image data from the image acquisition means 15 are an index of the state of the travel route for the second vehicle 20 traveling along the travel trajectory L1 later, such as on which field on the travel trajectory unevenness exists and in which point an obstacle exists. Accordingly, the information generated by accumulating the information D1 and showing the travel trajectory L1 and the state thereof is referred to as the travel trajectory information D1a. At the shortest, the travel trajectory information D1a is stored in the storage means 11 until the information is transmitted to the transmission reception means 22 of the second vehicle 20 or an alternative travel route L2 is selected without transmitting the information to the transmission reception means 22. For another work of a later, the travel trajectory information D1a as the information for demarcating the alternative travel route L2 may be stored in the storage means 11.

The operator transmits a command signal for staring travel of the second vehicle 20 and the travel trajectory information D1a from the transmission reception means 12 to the transmission reception means 22 of the second vehicle 20. Concerning a timing of the transmission, the transmission may be started at the middle of travel of the first vehicle 10 to the second point P2 (that is, at the middle of generation of the travel trajectory information D1a), or all the travel trajectory information D1a after the generation may alternatively be transmitted at once after reaching the second point P2. In the case in which the second vehicle 20 is desired to reach the second point P2 after the first vehicle 10 reaches the second point P2 without placing time so much, the transmission should be started at the middle of travel of the first vehicle 10 to the second point P2. The transmission may be performed by the operator operating the portable information terminal 18 in the first vehicle 10 while the portable information terminal 18 is arranged in the first vehicle 10, or may alternatively be performed with the portable information terminal 18 while the operator carries the portable information terminal 18, get off the first vehicle 10 and separates from the first vehicle 10.

At the middle of travel to the second point P2 or after reaching the second point P2, the operator can grasp the image data included in the travel trajectory information D1a for example by reproducing motion picture with the portable information terminal 18, whereby the operator can judges whether the travel trajectory L1 is suitable to the unmanned travel of the second vehicle 20 or not. Otherwise, it can be considered that data concerning the second vehicle 20 is stored in the storage means 11 of the portable information terminal 18, and when it is detected that an element showing that the travel trajectory L1 is not suitable to the travel of the second vehicle 20 is included in the travel trajectory information D1a, an alarm with image or sound is emitted automatically on the portable information terminal 18. Accordingly, when it is judged that the travel trajectory L1 is not suitable to the unmanned travel of the second vehicle 20, it can be considered that the operator does not transmit the travel trajectory information D1a to the transmission reception means 22 of the second vehicle 20 and transmits command information that the travel should be along the alternative travel route L2 from the transmission reception means 12 to the transmission reception means 22 for example by using the portable information terminal 18 as the route selection means 16 as discussed later. In the flow chart in FIG. 5, the selection whether the operator transmits the travel trajectory information D1a or not and the route selection process are omitted and the travel trajectory information D1a is supposed to be transmitted to the transmission reception means 22. However, actually, as mentioned above, in the movement system, an opportunity of selection of the travel route of the second vehicle 20 based on experience of the operator itself operating the first vehicle 10 and the travel trajectory information D1a stored in the storage means 11 is provided.

As mentioned above, after reaching the second point P2 or in the middle of the travel to the second point P2, when a cause which makes the second vehicle 20 difficult to travel is found on the travel trajectory L1 based on check of the travel trajectory information D1a or feeling of the operator operating the first vehicle 10, it can be considered that the operator returns to a point at which the cause exists or stops at the point and removes a phenomenon which brings the cause (for example, flattens a gap on which the second vehicle 20 is hard to travel). When the operator returns and removes the phenomenon which brings the cause, it can be considered that the information D1 of the actual position corresponding to the point in the travel trajectory information D1a is replaced with information after removing the cause so as to correct the travel trajectory information D1a. In the flow chart in FIG. 5, in a step S01, the travel trajectory information D1a received by the transmission reception means 22 of the second vehicle 20 includes the travel trajectory information D1a after corrected as the above. Accordingly, in the movement system, after emitting the travel start command to the second vehicle 20, an opportunity of correction of the state of the travel trajectory L1 (that is, correction of the travel trajectory information D1a) based on experience of the operator itself operating the first vehicle 10 and the travel trajectory information D1a stored in the storage means 11 is provided.

<2-2. Outward Travel to Work Objective Position by Second Vehicle 20>

When the transmission reception means 22 of the second vehicle 20 receives signals of the travel start command SS of the second vehicle 20 and the travel trajectory information D1a (step S01), the judgment means 27 judges whether the travel of the second vehicle 20 is started or not based on the travel trajectory information D1a (step S02). When it is judged that the travel should be started (step S02, YES), the second vehicle 20 leaves the first point P1 and travels unmannedly to the second point P2 along the travel trajectory L1 based on the travel trajectory information D1a (step S03). During the travel, acquisition of the information by the actual position detection means 23, the inclination detection means 24, the image acquisition means 25 and the obstacle detection means 26 (the information acquired by these means is synthetically referred to as "information D2") is performed, and the information D2 is accumulated in the storage means 21 (step S04). Namely, during the unmanned travel of the second vehicle 20, the actual position detection means 23 acquires the actual position information. The inclination detection means 24, the image acquisition means 25 and the obstacle detection means 26 as the information acquisition means acquiring information concerning a state of the second vehicle 20 and a state around the second vehicle 20 acquire inclination state information of second vehicle 20 and image information and obstacle information around the second vehicle 20. The inclination state information, the image information and the obstacle information are related with each of the actual position information, that is, regarded as information of the inclination state of the second vehicle 20 and the image information and the obstacle information around the second vehicle 20 at each actual position. The actual position information, and the inclination state information, the image information and the obstacle information related with the actual position information are accumulated in the storage means 21 as the information D2.

During the travel along the travel trajectory L1, for every acquisition of the information D2 at each actual position, differential information ΔD between the information D1 at the actual position corresponding to the actual position at which the information D2 is acquired in the travel trajectory information D1a and the information D2, that is, a parameter value as the differential information ΔD acquired by comparing the inclination state information and the image information at D2 (the information acquired by the inclination detection means 24 and the image acquisition means 25) with the inclination state information and the image information at D1 (the information acquired by the inclination detection means 14 and the image acquisition means 15) at the same actual position (the actual position detected by the actual position detection means 23 corresponds to the actual position detected by the actual position detection means 13) (hereinafter, the value is referred to as "differential information ΔD") is calculated by the judgment means 27 (step S05). Concerning the differential information ΔD, a permissible range as a judgment standard whether the travel of the second vehicle 20 is continued or not, and the judgment means 27 judges whether the travel is continued or stopped based on whether the differential information ΔD excesses the permissible range or not (step S06). For preventing of the cause of stop of the travel from being overlooked by an error of the differential information ΔD or the like, in addition to the judgment based on the differential information ΔD, whether the obstacle detection means 26 detects a thing acting as an obstacle for the second vehicle 20 during the travel or not is checked (step S07) so as to judge whether the travel is continued or stopped.

When the differential information ΔD is within the permissible range (step S06, YES) and the obstacle detection means 26 does not detect any obstacle (step S07, NO), the unmanned travel of the second vehicle 20 along the travel trajectory L1 of the first vehicle 10 is continued. The continue of the travel along the travel trajectory L1 includes the case in which for example when an obstacle exists, the vehicle departs slightly from the travel trajectory L1 so as to avoid the obstacle, and is distinguished from the case accompanied by an action that the second vehicle 20 return from the point at which the travel is stopped such as selection of an alternative travel route L3 in the case of stop of the travel discussed later.

When the second vehicle 20 reaches the second point P2 (step S08, YES), the acquisition and accumulation of the information D2 is finished (step S09). The accumulation of the detection signals in the storage means 21 from the actual position detection means 23 so far is set to a travel trajectory L1a of the second vehicle 20 itself from the first point P1 to the second point P2. The accumulation of the information by the inclination detection means 24, the image acquisition means 25 and the obstacle detection means 26 is set to information how the inclination state of the second vehicle 20 itself is and whether a thing which serve as an obstacle to the second vehicle 20 itself exists or not during the travel along the travel trajectory L2. These are set to an index of a state of return travel of the second vehicle 20 as discussed later. The accumulation of the information D2 is set to travel trajectory information D2a. Accordingly, the travel trajectory information D2a must be stored in the storage means 21 at least until the return travel of the second vehicle 20 to the first point P1.

<2-3. Case in which Second Vehicle 20 does not Start Outward Travel>

At the first point P1, when the judgment means 27 finds information showing a thing which obstructs the travel of the second vehicle 20 in the travel trajectory information D2a and judges that the travel of the second vehicle 20 cannot be started (step S02, NO), the travel of the second vehicle 20 is not started (the travel is suspended) and the travel suspension information E1 notifying the suspension of the travel is transmitted from the transmission reception means 22 to the transmission reception means 12 (step S21). The travel suspension information E1 includes information specifying a cause of the travel suspension of the second vehicle 20 among the travel trajectory information D1a. For example, the information shows that a point with an obstacle (a fallen tree or the like) over which the first vehicle 10 can get and the second vehicle 20 cannot get is included in the travel trajectory L1.

When the transmission reception means 12 receives the travel suspension information E1, the operator during operating the first vehicle 10 or after reaching the second point P2 can take measures to make the second vehicle 20 reach the second point P2 by removing or avoiding the cause of the travel suspension of the second vehicle 20 based on the travel suspension information E1. When the cause is an obstacle at a certain point in the travel trajectory L1, it can be considered that the operator operates the first vehicle 10 (when the operator is under operating to the second point P2, returns by backing or U-turn), goes to the point and removes the obstacle. When the cause of the travel suspension on the travel trajectory L1 is removed (problem is solved) accordingly, a signal of the problem solution information E1a is transmitted from the transmission reception means 12 to the transmission reception means 22. The signal of the problem solution information E1a notifies the removal of the cause of the travel suspension to the second vehicle 20 and commands start of the travel to the second vehicle 20. As a means for notifying the removal of the cause of the travel suspension, it can be considered that in the state in which the problem is solved, the first vehicle 10 passes through the point, and information acquired by the actual position detection means 13, the inclination detection means 14 and the image acquisition means 15 at this time is included in the problem solution information E1a. Otherwise, simply, the signal of the problem solution information E1a resets the travel suspension information E1. When the problem solution signal E1a is received by the transmission reception means 22 (step S22, YES), the judgment means 27 judges whether the travel can be started or not again (step S02), and when it is judged that the travel can be started (step S02, YES), the travel to the second point P2 along the travel trajectory L1 is started (step S03).

For example, when the cause of the travel suspension is inclination over which the first vehicle 10 can get and the second vehicle 20 cannot get and cannot be removed, it can be considered that another route is selected and the second vehicle 20 travels along it. Herein, in at least one of the storage means 11 and 21, the alternative travel trajectory L2 from the first point P1 to the second point P2 which is different from the travel trajectory L1 and alternative travel trajectory information D1b concerning a state of the alternative travel trajectory L2 are stored, and the information can be shared between the storage means 11 and 21 by the transmission reception means 12 and 22. As the alternative travel trajectory L2, a past travel trajectory of the first vehicle 10 from the first point P1 to the second point P2 or the travel trajectory of the second vehicle 20 itself from the first point P1 to the second point P2 along the travel trajectory of the first vehicle 10 can be considered. As such an embodiment referring to FIG. 3, in the case in which the judgment means 27 finds information concerning a travel obstacle for the second vehicle 20 in the travel trajectory information D1a acquired by the outward travel of the first vehicle 10 through the main road 7 to the second point P2 and determines stop of the travel, when in the past, the first vehicle 10 reaches the second point P2 along a route which goes from the warehouse 1a through the main road 7 to a branch point to the detour 8 and enters the detour 8 from the branch point, and the travel trajectory information of the first vehicle 10 or the travel trajectory information of unmanned travel of the second vehicle 20 along the travel trajectory of the first vehicle 10 is stored in the storage means 11 or 21, the travel trajectory can be set to the alternative travel trajectory L2, and information concerning the travel trajectory and a state thereof can be set to the alternative travel trajectory information D1b.

The selection of the alternative travel trajectory L2 is performed optionally by the operator operating the first vehicle 10. Herein, the route selection means 16 is provided in the portable information terminal 18 of the first vehicle 10. For example, the route selection means 16 is a touch panel and displays a map as shown in FIG. 3, a plurality of travel trajectories including this time's travel trajectory L1 and the past travel trajectories are displayed with line on the map, and by touching one of the past travel trajectories (other than this time's travel trajectory L1) on the map with a finger, the travel trajectory is selected as the alternative travel trajectory L2. In the route selection means 16, the route can be searched with the GPS, and the route stored in the storage means 11 or 21 can be called up. When the alternative travel trajectory L2 is selected accordingly, the operator transmits the alternative travel trajectory information D1b thereof and the signal of the travel start command SS from the transmission reception means 12 to the transmission reception means 22. In the travel trajectory of the second vehicle 20, in the case in which a signal of the problem solution information E1a is not received (step S22, NO), when the alternative travel trajectory information D1b and the signal of the travel start command SS are received (step S23, YES), the judgment means 27 judges whether the travel can be started or not based on the alternative travel trajectory information D1b (step S24). When it is judged that the travel should be suspended (step S24, NO), the travel stop information E1 which includes information concerning the cause of the travel suspension included in the alternative travel trajectory information D1b is transmitted from the transmission reception means 12 to the transmission reception means 22 (step S21). When it is judged that the travel can be started (step S24, YES), the second vehicle 20 travels unmannedly to the second point P2 along the alternative travel trajectory L2 (step S25).

In the case in which the cause of the travel suspension in the travel trajectory L1 cannot be removed and there is no history of past travel to the second point P2 along another route so that the alternative travel trajectory L2 cannot be selected, the second vehicle 20 does not receive the signal of the problem solution information E1a, the alternative travel trajectory information D1b and the signal of the travel start command SS (step S22, NO and step S23, NO). In this case, the first vehicle 10 receiving the travel stop information E2 returns to the first point P1 (the warehouse 1a) and travels along a new route (for example, a route leading to the second point P2 via the detour 8) so as to generate newly the travel trajectory L1 from the first point P1 to the second point P2 and the travel trajectory information D1a concerning the state thereof. In the second vehicle 20, when the new travel trajectory information D1a and the signal of the travel start command SS are received by the transmission reception means 22 (step S01), whether the unmanned travel along the travel trajectory L1 should be started or not is judged based on the travel trajectory information D1a (step S02).

It may be configured that when the alternative travel trajectory L2 is stored in the storage means 11 or 21, the second vehicle 20 can select automatically the stored alternative travel trajectory L2 and start the unmanned travel along it without waiting reception of the alternative travel trajectory information D1b and the signal of the travel start command SS based on selection operation of the alternative travel trajectory L2 by the operator of the first vehicle 10 as mentioned above (step S23). In this case, when the alternative travel trajectory information D1b concerning the alternative travel trajectory L2 is stored in the storage means 11, the second vehicle 20 accesses automatically the storage means 11 with the wireless communication system (A or B) and acquires the alternative travel trajectory information D1b.

In the case in which the first vehicle 10 travels from the first point P1 to the second point P2 by the route search function of the route selection means 16 with the GPS, the route selection means 16 is utilizable to select whether route the first vehicle 10 travels along. As mentioned above, in the case in which the operator judges that it is hard for the second vehicle 20 of the unmanned travel to travel along the actual course during the first vehicle 10 travels from the first point P1 to the second point P2, it can be considered that the travel trajectory information D1a concerning the travel trajectory L1 is not transmitted, and the alternative travel trajectory L2 is selected by using the route selection means 16, information concerning the alternative travel trajectory L2 is transmitted from the transmission reception means 12 to the transmission reception means 22, and the second vehicle 20 travels along the alternative travel trajectory L2.

During the travel along the alternative travel trajectory L2 (step S25), similarly to the travel along the travel trajectory L1, the information D2 is acquired by using the actual position detection means 23, the inclination detection means 24, the image acquisition means 25 and the obstacle detection means 26 (step S04). Accordingly, in this case, accumulation of the actual position information acquired by the actual position detection means 23 until time of arrival to the second point P2 (step S08, YES) draws a travel trajectory L2a of the second vehicle 20 along the alternative travel trajectory L2, and the travel trajectory information D2a generated by the information D2 accumulated until reaching the second point P2 means accumulation of the travel trajectory L2a acquired by the travel of the second vehicle 20 along the alternative travel trajectory L2 and information concerning a state of the travel trajectory L2a (step S09).

During the travel along the alternative travel trajectory L2 (step S25), in the case in which information acquired by the first vehicle 10 or the travel of the second vehicle 20 along the alternative travel trajectory L2 is stored in the storage means 21 (otherwise, the information is stored in the storage means 11 and received by the transmission reception means 22 from the transmission reception means 12) as the above, "calculation of (differential information) ΔD" as the step S05 in FIG. 5 means calculation of a value as differential information between information acquired by traveling along the past alternative travel trajectory L2, which is acquired from memory of the storage means 21 or by reception of the transmission reception means 22, and the information D2 acquired actually, and the differential information "ΔD" as a judgment standard whether the cause of the travel stop exists or not in the step S06 is also the differential information of this mean. It is similar to the case discussed later in which the second vehicle 20 stops the travel under the outward travel along the travel along the travel trajectory L1 (step S31) and subsequently selects the alternative travel route L3 and performs the outward travel (step S39).

<2-4. Case in which Second Vehicle 20 Stops Travel Under Outward Travel>

In the case in which under the travel of the second vehicle 20 along the travel trajectory L1, the differential information ΔD between the information D1 and D2 (namely, between information acquired by the inclination detection means 24 and the image acquisition means 25 at a certain actual position and information acquired by the inclination detection means 14 and the image acquisition means 15 at the actual position in the travel trajectory information D1a) excesses the permissible range (step S06, NO), or in the case in which the obstacle detection means 26 detects an obstacle (step S07, YES) though the differential information ΔD is within the permissible range (step S06, YES), the judgment means 27 judges that the travel of the second vehicle 20 should not be continued, stops the travel of the second vehicle 20 (step S31) and transmits the travel stop information E2 notifying the stop of the travel from the transmission reception means 22 to the transmission reception means 12 (step S32). The travel stop information E2 includes information concerning abnormality (the value excessing the permissible range) in the differential information ΔD which causes the travel stop or information concerning the obstacle detected by the obstacle detection means 26. For example, it is information showing the state that under the travel of the second vehicle 20 along the travel trajectory L1, at a certain point, an obstacle which does not exists under the travel of the first vehicle 10 is found and it is judged that the second vehicle 20 cannot avoid the obstacle and continue the travel.

When the travel stop information E2 is received by the transmission reception means 12, the operator operating the first vehicle 10 and reaching the second point P2 can take measures to make the second vehicle 20 reach the second point P2 by removing or avoiding the cause of the travel stop of the second vehicle 20 based on the travel stop information E2. When the cause is an obstacle at a certain point in the travel trajectory L1, it can be considered that the operator operates the first vehicle 10, goes to the point of the travel stop of the second vehicle 20 and removes the obstacle. When the obstacle is removed accordingly, similarly to the problem solution information E1a, problem solution information E2a which includes a command urging resumption of the travel of the second vehicle 20 and information notifying solution of the problem is transmitted from the transmission reception means 22 to the transmission reception means 12. In this case, since the operator operating the first vehicle 10 goes to the point of the travel stop of the second vehicle 20, the actual position detection means 23, the inclination detection means 24 and the image acquisition means 25 can sense the state of removal of the obstacle (namely, judgement whether resumption of the travel of the second vehicle 20 is possible or not in a step S34 can be performed), whereby it can be considered that the problem solution information E2a is simply a signal of the command of resumption of the travel. Accordingly, the problem solution information E2a is received by the transmission reception means 22 (step S33, YES) and the actual position detection means 23, the inclination detection means 24 and the image acquisition means 25 of the second vehicle 20 sense the state of removal of the obstacle and the judgment means 27 judges that the travel can be started (resumed) (step S02, YES), whereby the second vehicle 20 resumes the travel to the second point P2 along the travel trajectory L1 (step S03).

In the case in which the cause of the travel is for example inclination, which does not exists under the travel of the first vehicle 10 and generated newly by mudslide or the like, and the state of the cause cannot be improved immediately, it can be considered that the second vehicle 20 travels to the second point P2 by using the alternative travel trajectory L3 which is the past travel trajectory of the first vehicle 10 or the second vehicle 20. In an example in FIG. 3, in the case of meeting with the obstacle on the main road 7, when the travel trajectory of the first vehicle 10 or the second vehicle 20 through the detour 8 is stored in the storage means 11 or 21, it can be considered that the travel trajectory is selected as the alternative travel trajectory L3 and alternative travel trajectory information D1c thereof is acquired, whereby the second vehicle 20 returns to the branch point to the detour 8 and travels to the second point P2 along the alternative travel trajectory L3 on the detour 8. Otherwise, in the case of meeting with the obstacle on the fork road 8a, it can be considered that the second vehicle 20 returns to the point at which the detour 8 branches to the two fork roads 8a and 8b and travels to the second point P2 along the alternative travel trajectory L3 on the fork road 8b.

In the second vehicle 20, an optimum one of the travel trajectories acquired from the information stored in the storage means 21 (or acquired by accessing the information stored in the storage means 11) may be selected as the alternative travel trajectory L3. However, in this embodiment, the operator operating the first vehicle 10 selects optionally the travel trajectory by using the route selection means 16 and transmits a result of the selection from the transmission reception means 12 to the transmission reception means 22, whereby the alternative travel trajectory L3 is selected. Namely, in the case in which the second vehicle 20 stops the travel (step S31) and transmits the travel stop information E2 (step S32), when the alternative travel trajectory information D1c and the signal of the travel start command SS is received (step S36, YES) while the problem solution information E2a is not received (step S33, NO), the judgment means 27 judges whether the travel along the alternative travel trajectory L3 can be performed or not based on the alternative travel trajectory information D1c (step S35). When it is judged that the travel cannot be performed (step S35, NO), the travel stop information E2 including information concerning the cause of the travel stop included in the alternative travel trajectory information D1c is newly transmitted from the transmission reception means 22 to the transmission reception means 12 (step S32), and next signal from the first vehicle 10 is waited.

When it is judged that the travel can be performed in step S35 (YES), the vehicle 20 returns to a starting point of the alternative travel trajectory L3 (a meeting point of the travel trajectory L1 and the alternative travel trajectory L3) by backing or U-turn (step S37). The starting point may be the first point P1. Under the returning travel, the information D2 acquired between the starting point of the alternative travel trajectory L3 and a travel stop point is reset (step S37). When reaching the starting point of the alternative travel trajectory L3 (step S37, YES), the unmanned travel along the alternative travel trajectory L3 is started from the starting point (step S38), and during the travel along the alternative travel trajectory L3, the information D2 is acquired by using the actual position detection means 23, the inclination detection means 24, the image acquisition means 25 and the obstacle detection means 26 (step S04). Namely, the information D2 accumulated in the storage means 21 until reaching the second point P2 so as to generate the travel trajectory information D2a is the information D2 acquired under the travel from the first point P1 to the starting point of the alternative travel trajectory L3 which is at a middle of the travel trajectory L1a and the information D2 acquired under the travel from the returning point through the alternative travel trajectory L3 to the second point P2.

Accordingly, the accumulation of the information D2 until the time of arrival of the second vehicle 20 traveling along the alternative travel trajectory L3 to the second point P2 (step S08, YES) draws a travel trajectory L3a of the second vehicle 20 from the first point P1 to the second point P2, and the travel trajectory L3a and the travel trajectory information D2a concerning it are generated (step S09).

As mentioned above, as evident from that the information D2 acquired in the reciprocal route between the returning point and the travel stop point is reset, the travel trajectory L3a of the travel of the second vehicle 20 along the alternative travel trajectory L3 shows the travel trajectory in one outward direction from the first point P1 to the second point P2 and does not include the travel trajectory of round trip between the returning point and the travel stop point. For example, the alternative travel trajectory L3 in the case in which the obstacle exists at the middle of the fork road 8a and the second vehicle 20 stops the travel at this point, returns to the point at which the detour 8 branches to the two fork roads 8a and 8b and travels to the potato cultivation ground 5 as the second point P2 through the fork road 8b as mentioned above shows a route going from the warehouse 1a which is the first point P1 through the main road 7 at the front of the house 1 and the warehouse 1a, entering the detour 8, and going from the branch point of the detour 8 to the two fork roads 8a and 8b along the fork road 8b to the potato cultivation ground 5, and does not include a route on the fork road 8a between the travel stop point and the branch point of the detour 8 on which the second vehicle 20 moves reciprocally actually. That is because the outward travel trajectory of the second vehicle 20 is stored for the purpose of being used as a return travel route of the second vehicle 20.

Accordingly, each of the travel trajectory L2a and the travel trajectory L3a may overlap the travel trajectory L1a along the travel trajectory L1 of the first vehicle 10 from the first point P1 to the middle, and the travel trajectory L2a and the travel trajectory L3a are common in that it is the outward travel trajectory from the first point P1 to the second point P2 along the route other than the travel trajectory L1 or the route branched from the middle of the travel trajectory L1. The travel trajectory L2a and the travel trajectory L3a are distinguished by definition that the travel trajectory L2a is drawn as a result of the travel to the second point P2 by using the alternative travel trajectory L2 set before staring the travel at the first point P1 and the travel trajectory L3a is drawn as a result of the travel to the second point P2 by using the alternative travel trajectory L3 after the action that the vehicle stops the travel in the middle from the first point P1 to the second point P2 and returns.

In the case in which the cause of the travel stop is not removed (the state in which the second vehicle 20 does not receive the problem solution information E2a (step S33, NO)) and there is no effective past alternative travel trajectory information D1c (including the case in which the one alternative travel trajectory L3 is selected, the second vehicle 20 receives the information D1c thereof, judges that the travel cannot be started and transmits newly the travel stop information E2, and then there is no effective alternative travel trajectory L3), the first vehicle 10 should travel so as to generate newly the alternative travel trajectory L3 and the information D1c thereof. The starting point of the alternative travel trajectory L3 generated newly accordingly may be not the middle of the travel trajectory L1 but the first point P1. However, even in the case of generating newly the travel trajectory, the fact remains that the second vehicle 20 must return to the starting point of the alternative travel trajectory L3 and the information D2 must be reset in the meantime. Accordingly, the alternative travel trajectory information "D1c" of the step S34 and the alternative travel trajectory "L3" of the steps S36 to S38 includes the alternative travel trajectory information D1c and the alternative travel trajectory L3 generated by the travel of the first vehicle 10 along another route.

The information D2 acquired between the starting point of the alternative travel trajectory L3 and the travel stop point is configured to be reset. However, it can be considered that the information D2 is not reset and stored as information for notifying existence of the cause of the travel stop in the route apart from the information of the travel trajectory L3.

<3. Work System (Work at Work Objective Position)>

The manned operating travel first vehicle 10 is used for demarcating an area and a route in which the second vehicle 20 should work and travel as preparation for starting the work of the second vehicle 20 at the second point P2. After reaching the second point P2 which is the work objective position, the unmanned operating travel second vehicle 20 work by using the wireless communication between the transmission reception means 12 and 22. Under the work by the unmanned operating travel of the second vehicle 20, the first vehicle 10 is used as a move means for the operator to take the break or for going to the forest 2 so as to gather firewood as mentioned above, or used for performing work assisting the work of the second vehicle 20. In this work system, at a scene and area at which the operator is required for establishing the work by the unmanned operating travel of the second vehicle 20, the operator is concerned with the work of the second vehicle 20 by using the first vehicle 10 so as to secure flexibility of action of the operator under the work of the second vehicle 20, and the wireless communication between the transmission reception means 12 and 22 is used so as to secure this state.

Figure 8:
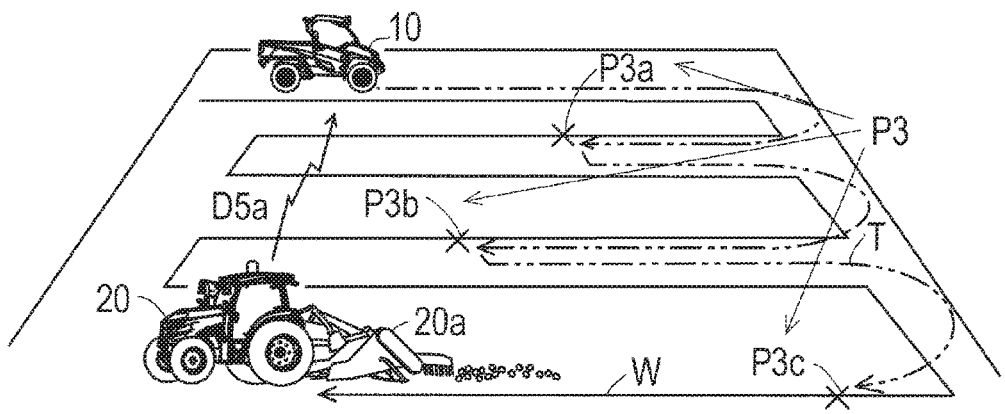
FIG. 8 is an image drawing that a processing point for the manned travel work vehicle is demarcated under the work travel of the unmanned travel work vehicle.
Figure 9:
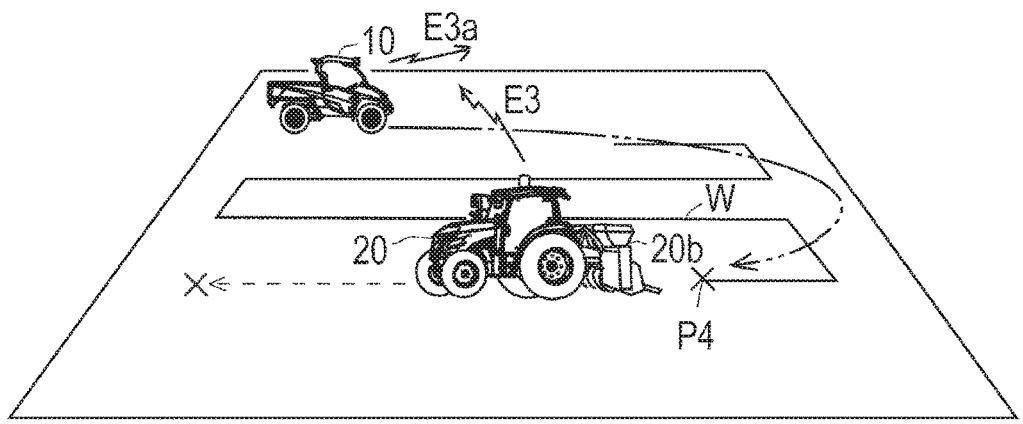
FIG. 9 is an image drawing that the unmanned travel work vehicle stops the travel under the work travel and the manned travel work vehicle moves to the travel stop point.
Figure 10:
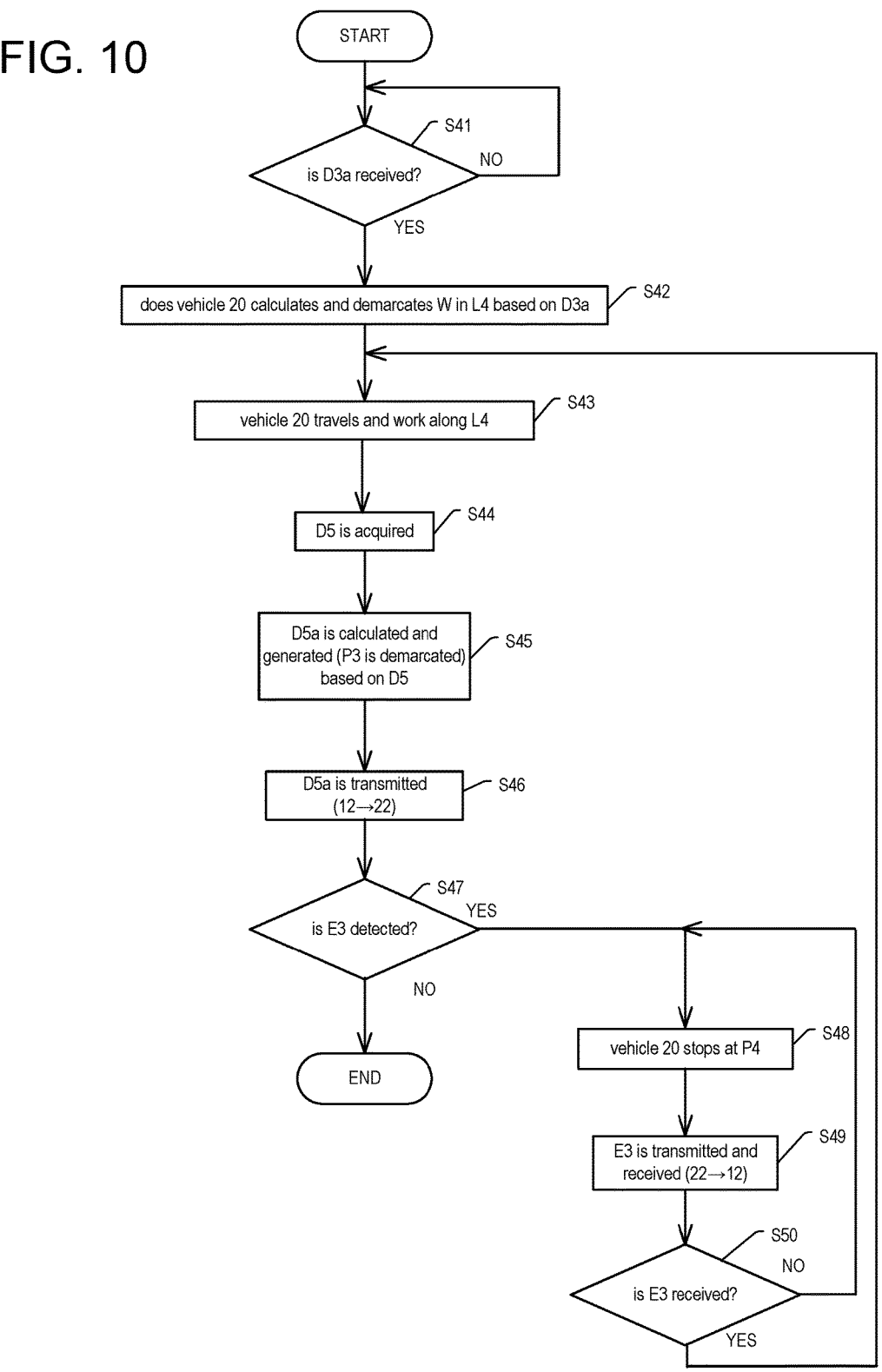
FIG. 10 is a flow chart of work travel control of the unmanned travel work vehicle.

As a mode in which the wireless communication is adopted between the second vehicle 20 and the first vehicle 10 (or the portable information terminal 18 detached from the first vehicle 10) for the work with the second vehicle 20 accordingly, a first mode: demarcation of the work area or the work route, a second mode: specification of a processing point under the work travel, and a third mode: stop of the work travel exist, and these are explained referring to image drawings in FIGS. 6 to 9 and a flow chart of work travel control of the second vehicle in FIG. 10.

<3-1. First Mode: Demarcation of Work Area or Work Route>

Figure 6:
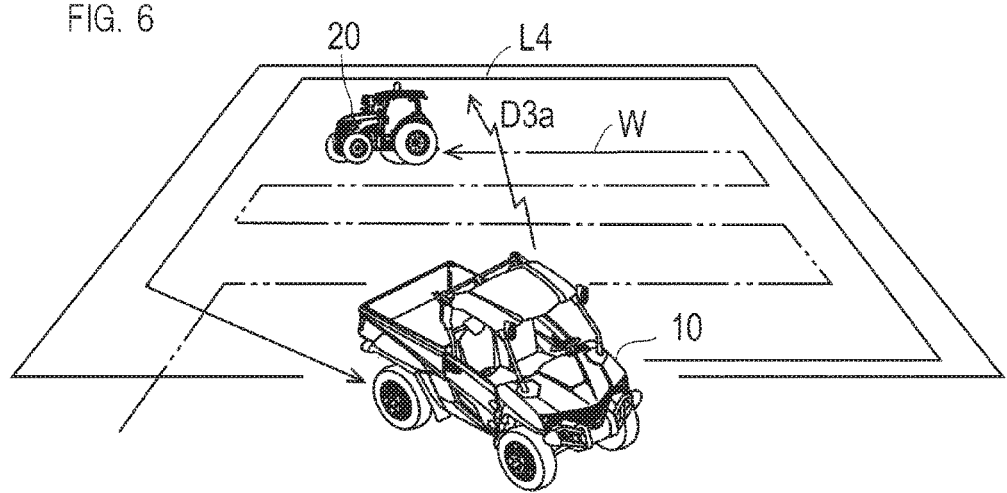
FIG. 6 is an image drawing of demarcation of a work travel route of the unmanned travel work vehicle within a boundary of a work area demarcated by the manned travel work vehicle.

After reaching the second point P2 which is the work objective position, the first vehicle 10 travels so as to demarcate the work area. As shown in FIG. 6, that is performed by making the first vehicle 10 travel by operation of the operator and demarcating a travel trajectory L4 thereof as a boundary of the work area. Namely, information D3 concerning the actual position detected by the actual position detection means 13 of the first vehicle 10 is accumulated in the storage means 11 under the travel, the travel is finished, and the acquisition and accumulation of the information is finished, whereby the accumulation of the information D3 so far is generated as the travel trajectory information D3 demarcating the travel trajectory L4 of the first vehicle 10. Preferably, under the travel for demarcating the travel trajectory L4, the detection and image acquisition with the inclination detection means 14 and the image acquisition means 15 are performed, whereby the information concerning the state of the boundary of the work area is also collected while relating with the information D3 concerning the actual position and is built in the travel trajectory information D3. Accordingly, by grasping the state of the boundary of the area, a state of an inside of the area is supposed, and accuracy of calculation of a work travel route W discussed later can be improved based on the supposition.

The travel trajectory information D3 concerning the travel trajectory L4 which is demarcated in the storage means 11 accordingly is transmitted from the transmission reception means 12 to the transmission reception means 22 of the second vehicle 20. In the second vehicle 20, by receiving the travel trajectory information D3 by the transmission reception means 22 (step S41, YES), the work area is recognized based on the travel trajectory information D3 (namely, the travel trajectory L4 of the first vehicle 10 is recognized as the boundary of the work area). Subsequently, in the calculation means 29, what work travel route W should be adopted for working and traveling over the whole work area surrounded by the travel trajectory L4 as much as possible is calculated (step S42), and the second vehicle 20 works and travels along the work travel route W determined by the calculation (step S43). It can be considered that the judgment means 27 judges permission or disapproval of start of the work travel of the second vehicle 20 in response to a result of calculation of the work travel route W similarly to the judgment of permission or disapproval of start of the outward travel discussed above (see the step S02 in FIG. 5).

As mentioned above, as the process demarcating the work area and the work travel route of the second vehicle 20, only by the travel of the first vehicle 10 on a line which is the boundary of the work area, the area in which the second vehicle 20 should work is demarcated, and the second vehicle 20 calculates the work travel route W in the area and travels automatically. Accordingly, a distance for which the operator operates the first vehicle 10 and travels actually prior to the work travel of the second vehicle 20 can be shortened, whereby free time for the operator operating the first vehicle 10 is increased.

Figure 7:
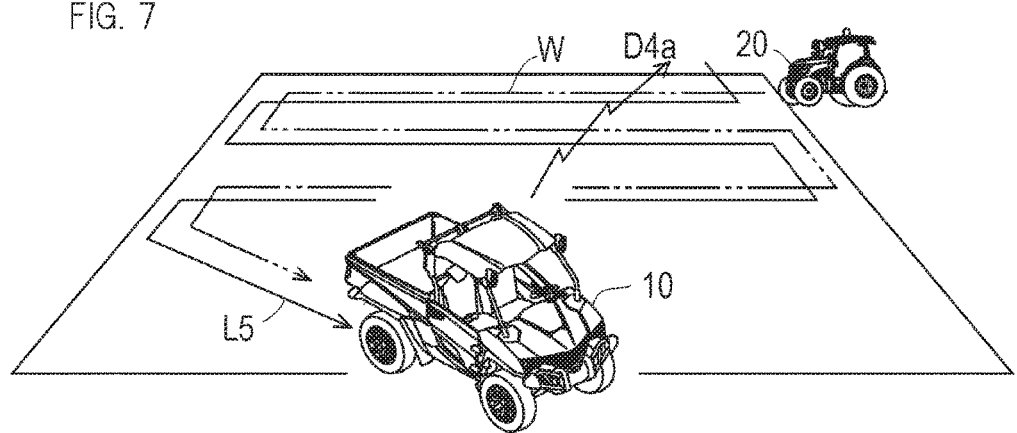
FIG. 7 is an image drawing that a travel trajectory of the manned travel work vehicle is adopted as the work travel route of the unmanned travel work vehicle.

Otherwise, as shown in FIG. 7, the work travel route W of the second vehicle 20 may be demarcated along a travel trajectory L5 of the first vehicle 10 operated by the operator. In the demarcation of the work travel route W for the second vehicle 20, under the travel of the first vehicle 10, the travel trajectory L5 is demarcated by acquisition and accumulation of information D4 (see FIG. 1 or 2) by using the actual position detection means 13, the inclination detection means 14 and the image acquisition means 15, and the travel trajectory L5 and the travel trajectory information D4a concerning a state thereof are transmitted to the second vehicle 20 by using the transmission reception means 12 and 22. Herein, preferably, by using the calculation means 29, a demarcation value of the travel trajectory L5 is corrected so as to make the work travel route suitable for the work travel of the second vehicle 20 for example in the point of a turning radius at a butt, and furthermore, a point which is not suitable for the travel of the second vehicle 20 is included in the travel trajectory L5 by inclination information in the travel trajectory information D4a or the like, to avoid passage of this point, and a route acquired by the value corrected accordingly is set to the work travel route W. Similarly to the judgement of permission or disapproval of the outward travel (see the step S06 of FIG. 5), it can be considered that the judgment means 27 judges permission or disapproval of start of the work travel of the second vehicle 20. For example, as mentioned above, when the judgment means 27 judges that the travel of the second vehicle 20 cannot avoid passage of inclined ground though the calculation of the work travel route W is suitable for the second vehicle 20, the travel stop information may be transmitted from the transmission reception means 22 to the transmission reception means 12 (see the step S21 of FIG. 5) so as to urge the operator to improve.

As the above, in comparison with the method demarcating the boundary of the work area by the travel trajectory L4 of the first vehicle 10 as shown in FIG. 6, in the demarcation process of the work travel route of the second vehicle 20 as shown in FIG. 7, though the distance for which the operator operates the first vehicle 10 and travels is increased, the operator can grasp work travel environment of the second vehicle 20 well while traveling the first vehicle 10 actually before the work travel of the second vehicle 20, whereby it can be considered that the work travel route more suitable for the second vehicle 20 can be set with high accuracy.

In either the embodiment shown in FIG. 6 or the embodiment shown in FIG. 7, the manned operating travel of the first vehicle 10 for demarcating the boundary of the work area (the travel trajectory L4) or the work travel route (the travel trajectory L5) should be performed before the time of starting the work of the second vehicle 20. Herein, by the movement system concerning the outward travel as mentioned above, without the operator caring about the unmanned operating travel state of the second vehicle 20 one by one, the operator can arrive the second point P2 which is the work objective position early before the second vehicle 20, and by adjusting transmission timing of the travel trajectory information D1a, a time zone of the outward travel of the second vehicle 20 by the unmanned operation can be adjusted, whereby a time margin for the manned operating travel of the first vehicle 10 for demarcating the boundary of the work area or the work travel route of the second vehicle 20 can be secured. Namely, by the movement system for the outward travel as mentioned above, travel flexibility of the manned operating travel first vehicle 10 concerning the outward movement is improved, whereby a margin is brought to a preparation process for the second vehicle 20 with the first vehicle 10 in the work objective position (P2). Accordingly, by establishing the good movement system, the good work system is established.

<3-2. Second Mode: Specification of Processing Point Under Work Travel>

FIG. 8 shows the situation of harvest work of subterranean crops (herein, it considers as potatoes) with this system as an embodiment to which the second mode is adopted. A tractor as the second vehicle 20 is equipped with a digging machine 20a, and the second vehicle 20 travels on the work travel route W while digging up the potatoes with the digging machine 20a. Under the travel along the work travel route W, the second vehicle 20 specifies processing points P3 (P3a, P3b and P3c) to which the first vehicle 10 should go and perform process. In this case, the processing point P3 means a point at which an amount of the dug potatoes reaches one loading unit (for example, one container). Accordingly, the second vehicle 20 acquires information D5 for demarcating the processing point P3 (step S44) while performing the work travel and performs calculation process with the calculation means 29 based on the information D5, thereby demarcating the processing point P3 (step S45). As the information D5, for example, when a fixture amount corresponding to mileage is calculated uniformly, detection data of the actual position detection means 23, a normal mileage detection means or the like is set to the information D5, and based on the mileage calculated from it, the processing point P3 can be determined. Otherwise, by using the image acquisition means 25, an image of crops dug up actually is set to the information D5 and number of the dug-up crops is counted based on the image, whereby the processing point P3 is demarcated based on the counted number and the information of actual position detected by the actual position detection means 23. Otherwise, exclusive detection means and calculation means for demarcating the processing point P3 suitable for a kind of the work are provided.

The information generated by the calculation process is transmitted as the processing point information D5a demarcating the processing point P3 from the transmission reception means 22 to the transmission reception means 12 (step S46). The processing point information D5a may be transmitted after the whole process of work by the second vehicle 20 is finished, or it may alternatively be configured that whenever the one processing point P3 is specified, the processing point information D5a corresponding to the processing point P3 is transmitted one by one. It may alternatively be configured that the operator can set transmission timing of the processing point information D5a by using the portable information terminal 18.

The case may exist that the processing points P3 (P3a, P3b and P3c) can be calculated before the work travel of the second vehicle 20 by using calculation function of the portable information terminal 18 provided in the first vehicle 10. In this case, it may alternatively be configured that the information of the processing point P3 deduced by the first vehicle 10 is transmitted to the transmission reception means 22 of the second vehicle 20 and stored in the storage means 21, and under the work travel of the second vehicle 20, whenever passage of the processing point P3 is detected based on the stored information of the processing point P3, information notifying that the second vehicle 20 passes through the processing point P3 is transmitted to the transmission reception means 12. Whenever an information signal concerning the passage of the processing point P3 is received from the work travel of the second vehicle 20, the first vehicle 10 can recognize that the second vehicle 20 finishes the work to the point.

After completion of the work travel of the second vehicle 20, or following the second vehicle 20 under the work travel, the operator operates the first vehicle 10 and loads the crops (potatoes) dug up along the work travel route W into the first vehicle 10. Herein, in the harvest work by the first vehicle 10, the processing point information D5a received by the transmission reception means 12 is used. By the processing point information D5a demarcating the processing points P3 (P3a, P3b and P3c), the operator of the first vehicle 10 can grasp how much the work by the second vehicle 20 is advanced, how many the processing points P3 as points which should be processed by the first vehicle 10 exist, and where the processing points P3a, P3b and P3c are. Based on the information, the first vehicle 10 is operated so as to go to the processing points P3a, P3b and P3c and, for example, the dug-up potatoes are collected to a container and loaded to the first vehicle 10.

Concretely, firstly, the first vehicle 10 is stopped at the processing point P3a, and the operator getting off the first vehicle 10 collects the potatoes, which are dug up along the work travel route W, to one container while working along the work travel route W from the point at which the second vehicle 20 starts the work to the processing point P3a. Since each of the processing points P3 is calculates so that one container is filled up at the point, the container is filled up just when all the potatoes from the point at which the second vehicle 20 starts the work to the processing point P3a are collected, and the operator loads the container to a cargo bed of the first vehicle 10. Since the first vehicle 10 is stopped at the processing point P3a, a distance for which the operator carries the heavy container filled up with the potatoes to the cargo bed of the first vehicle 10 is shortened, whereby a burden of the work of collection and loading of the dug-up potatoes requiring hands is reduced. When the loading of the potatoes to the first vehicle 10 at the processing point P3a is finished accordingly, the operator makes the first vehicle 10 move to the next processing point P3b by manned operating travel, stops the first vehicle 10 at the processing point P3b, and gets off the first vehicle 10, and then collects the potatoes, which are dug up along the work travel route W, to the container, and loads the container filled up with the potatoes to the cargo bed of the first vehicle 10. After finishing the loading at the processing point P3b, the operator makes the first vehicle 10 move to the processing point P3c, collects the potatoes from the processing point P3b to the processing point P3c and loads the container at the processing point P3c. Accordingly, by the collection and loading work of the crops while stopping the first vehicle 10 at each of the processing points P3 the burden of the work by hands can be reduced, thereby realizing efficient harvest work.

By performing the work while making the first vehicle 10 stop at each of the processing points P3 after the second vehicle 20 finishes all the work, the operator of the first vehicle 10 grasps all the processing points P3 at the time of starting the collection and loading work with the first vehicle 10, and the operator can operates the first vehicle 10, travel around from the first processing point P3a to the final processing point P3c along the process movement route T which realizes efficient movement, and finishes the collection and loading of all the crops. Accordingly, the processing points P3 which can reduce the work by hands and realize efficient the collection and loading of the crops are calculated automatically by the calculation means 29, and the processing point information D4 concerning the processing points P3 is transmitted to the transmission reception means 12 by the wireless communication, whereby the operator of the first vehicle 10 can work with a margin such as taking a break until all the work processes are finished without monitoring all the time how work advance degree of the second vehicle 20 is (for example, without repeating reciprocal travel such that going to one processing point with the first vehicle 10, finishing the process, going to a waiting position of the second vehicle 20 under the work, and going to the next processing point P3b of the second vehicle 20, or without making the first vehicle 10 move along the work travel route W of the second vehicle 20 all the time so as to follow the second vehicle 20), and the processing work itself by hands of the operator can be performed efficiently.

As the harvest work by using the wireless communication between the transmission reception means 12 and 22, it can be considered that unmanned travel of the first vehicle 10 is enabled, the unmanned travel first vehicle 10 travels following the second vehicle 20 based on positon information from the second vehicle 20 under the work travel, or the first vehicle 10 travels unmannedly along the work travel route W after the work travel of the second vehicle 20, and the operator collects the dug-up crops near the first vehicle 10 and loads them to the first vehicle 10. In this case, it can be considered that each of the processing points P3 is set to a point at which the first vehicle 10 stops automatically. For example, firstly, the first vehicle 10 stops at the processing point P3a and the operator collects the crops and loads the crops to the first vehicle 10 on the ground. After finishing the loading work to the first vehicle 10 stopping at the processing point P3a, by the portable information terminal 18 detached from the first vehicle 10 and carried, the first vehicle 10 is ordered the travel to the next processing point P3b, and the first vehicle 10 goes to the processing point P3b by unmanned travel and stops. The operator collects the crops which should be loaded to the second vehicle 20 stopping at the processing point P3b and loads them to the second vehicle 20. After finishing the loading of the crops to the second vehicle 20 stopping at the processing point P3b, similarly to the above, the second vehicle 20 is made travel unmannedly and stop at the processing point P3c, and collection and loading of the crops to the second vehicle 20 stopping at the processing point P3c is performed.

<3-3. Stop of Work Travel>

When the second vehicle 20 stops the work travel by a certain cause, the fact of the stop and information concerning a stop position P4 are transmitted from the transmission reception means 22 to the transmission reception means 12, and the operator of the first vehicle 10 makes the first vehicle 10 travel to the stop position P4 of the second vehicle 20 and removes the cause based on the information received by the transmission reception means 12. The cause of the travel stop is generally divided into two.

One of them is a case in which a trouble besides assumption such as an obstacle on the ground or failure of a work machine attached to the second vehicle 20 which is the tractor occurs and treatment of the trouble by the operator of the first vehicle 10 must be waited. The trouble which is the obstacle can be grasped by acquisition of an image by the image acquisition means 25 and detection by the obstacle detection means 26 under the work travel. When the second vehicle 20 has a trouble detection means which is provided in a normal tractor such as a detection means of engine trouble or trouble of the work machine (for example, drive failure of a lift), the trouble can be detected by the means. By the information received by the transmission reception means 12, the operator of the first vehicle 10 grasps the fact of the travel stop of the second vehicle 20 and contents of the trouble which is the cause of the stop, operates the first vehicle 10, goes to the stop position P4 and removes the trouble. The judgment means 27 confirms the removal of the trouble and determines resume of the work travel of the second vehicle 20.

In a flow chart in FIG. 10, processes of the removal of the cause in the case in which the travel stop cause occurs under the harvest (digging up of the crops in the ground) work travel of the second vehicle 20 while setting the processing point P3 discussed above. Namely, under the work travel, in the second vehicle 20, when a signal of the travel stop information E3 showing a travel stop position and a travel stop cause is acquired (detected) (step S47), the judgment means 27 judges that the travel should be stopped and stops the second vehicle 20 there (step S48), and the travel stop information E3 including specification of the stop position P4, the stop cause and the like is transmitted from the transmission reception means 22 to the transmission reception means 12 (step S49), and according to it, the operator grasping the travel stop information E3 operates the first vehicle 10, goes to the stop position P4 and removes the trouble. Accordingly, when the travel stop information E3 is canceled, problem solution information E3a which is information concerning a travel start command and problem solution (removal of the travel stop cause) is transmitted from the transmission reception means 12 to the transmission reception means 22. When the problem solution information E3a is received by the transmission reception means 22 (step S50, YES), the second vehicle 20 resumes the (digging up) work travel (step S43), and under the work travel, acquires the information D5 and continues the work demarcating the processing point P3 (steps S44, S45).

The other of the two general causes is a case in which, inevitably on the character of the work done currently, the work travel must be stopped and the first vehicle 10 must go to the stop position P5 and wait the process for resuming the work. For example, FIG. 9 shows a situation of fertilizing work or seeding work by unmanned travel of the second vehicle 20 which is a tractor equipped with a work machine 20b for fertilizing work or seeding work such as a fertilizing machine, seeding machine or fertilizing seeding machine. Under the fertilizing work or seeding work, when a seeding hopper or a fertilizer container of the fertilizing machine or seeding machine which is the work machine 20b attached to the second vehicle 20 becomes empty, the second vehicle 20 stops the work travel, and the operator goes to the stop position P4 thereof and feeds seed or fertilizer. In this case, in the second vehicle 20, a detection means detecting an amount of seed or fertilizer is provided, and when the detection means detects lack of the seed or fertilizer, the judgment means 27 judges that the travel should be stopped, and the travel stop information E3 concerning the stop of the travel, the cause of stop of the travel and the stop position P4 is transmitted from the transmission reception means 22 to the transmission reception means 12. The operator of the first vehicle 10 recognizes the lack of the seed or fertilizer of the second vehicle 20 based on the information received by the transmission reception means 12, operates the first vehicle 10 and goes to the stop position P4, and feeds seed or fertilizer. The judgment means 27 confirms completion of the feeding work and determines resume of the work travel of the second vehicle 20.

As shown by the above explanation, in the flow chart in FIG. 10, a flow that the first vehicle 10 demarcates the boundary of the work area and subsequently the second vehicle 20 demarcates the work travel route in the work area inside the boundary as shown in FIG. 6 as an example of the first mode is combined with a flow of the harvest work that the second vehicle 20 performs the work travel digging up the crops in the ground (potatoes) and the first vehicle 10 is used for the collection and loading of the crops as shown in FIG. 8 as an example of the second mode. The third mode is a flow in consideration of the case in which whether the travel of the second vehicle 20 is stopped by occurrence of the travel stop cause or not under the digging-up work travel of the second vehicle 20 as the second mode. Accordingly, the flow chart in FIG. 10 is combination of the examples of the first mode, the second mode and the third mode. On the other hand, as the fertilizing or seeding work mentioned above, depending on the kind of the work, the second mode may not appear and the first mode and the third mode are combined.

Considered from a different angle, feeding of the seed or fertilizer in seeding or fertilizing work is the processing work performed by the operator operating the first vehicle 10 for concluding the work, whereby the stop position P4 as a feeding point of the seed or fertilizer can be said as a kind of processing point. Namely, similarly to the processing point P3 demarcated in the harvest work mentioned above, the first vehicle 10 goes to the point and performs the processing, and the second vehicle 20 must be stopped under the processing work, whereby as a result, the processing point is set to the stop position P4 similar to the case of the trouble processing. In other words, while there are the harvest work shown in FIG. 8 and the seeding or fertilizing work shown in FIG. 9 as the work concluded in that the second vehicle 20 of the unmanned operating travel performs the work travel and the first vehicle 10 supports the work by using the work system, the harvest work is included in the second mode in which the processing point P3 is specified while the second vehicle 20 continues the work travel, and the seeding or fertilizing work is included in the third mode in which the stop position P4 at which the second vehicle 20 stops the work travel is specified. As shown in FIG. 10, the specification of the stop position P4 for the trouble processing included in the third mode may occur in the harvest work travel included in the second mode and in the seeding or fertilizing work travel included in the third mode.

Accordingly, for the seeding or fertilizing work travel of the second vehicle 20, the flow of the steps S41 to S43 and S47 to S50 in FIG. 10 which is not shown as a flow chart is used. Herein, the travel stop information E3 (demarcation of the stop position P4) includes both the travel stop information for feeding the seed or fertilizer and the travel stop information for processing another trouble.

As the above, the information concerning the fact that the second vehicle 20 under the work travel stops the travel, the stop position P4 and the cause of the travel stop can be notified by reception by the transmission reception means 12. Accordingly, for example at the time of getting off the first vehicle 10 and taking a rest at a rest station provided in somewhere in the ground, by carrying the portable information terminal 18 detached from the first vehicle 10, the operator can grasp the information received by the transmission reception means 12 of the portable information terminal 18 so as to treat suitably the second vehicle 20 which stops the travel.

<4. Return Movement System (Return Travel from Work Objective Position)>

Figure 11:
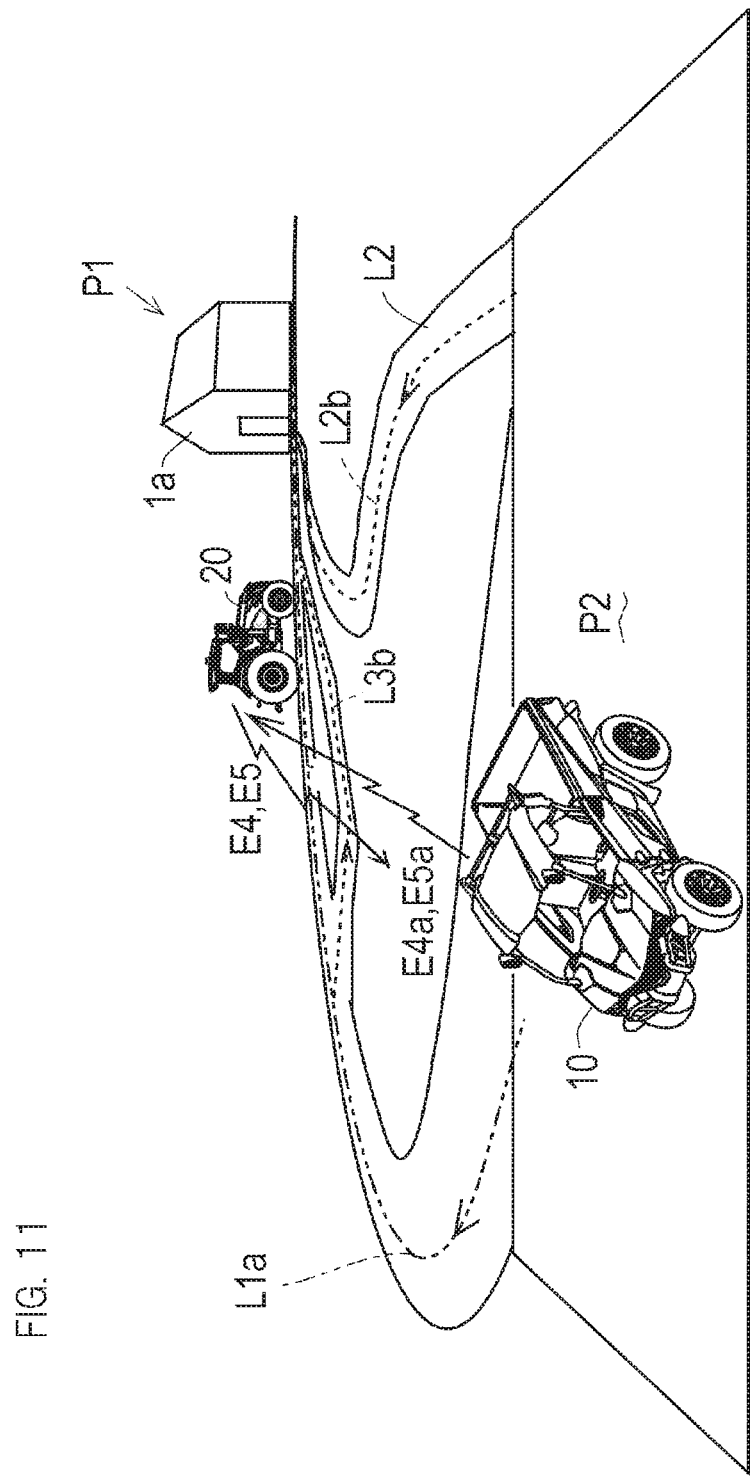
FIG. 11 is an image drawing of return travel of the unmanned travel work vehicle.

For example, in the potato harvest work as mentioned above, the harvest and loading work by the first vehicle 10 operated by the operator is performed after the second vehicle 20 finishes all the digging-up work, whereby it can be considered that the second vehicle 20 is made to perform return travel to the first point P1 under the work of the first vehicle 10 at the second point P2 which is the work objective position. Namely, previously to the first vehicle 10, the second vehicle 20 is made to perform the return travel unmannedly. Then, a return movement system using wireless communication as shown in FIGS. 11 and 12 is adopted.

Under the return travel of the second vehicle 20, in the storage means 21 of the second vehicle 20, the travel trajectory information D2a, that is, the information concerning the travel trajectory L1a of the outward travel of the second vehicle 20 along the travel trajectory L1 of the first vehicle 10 and the situation thereof or the travel trajectory L2a or L3a along the travel trajectory L2 or L3 and the situation is stored. Then, when the operator of the first vehicle 10 emits the travel start command SS to the second vehicle 20 and the signal of the travel start command SS is received by the transmission reception means 22 (step S61 in FIG. 12, YES), the second vehicle 20 reads up the travel trajectory information D2a (step S62 in FIG. 12). Herein, for example, when a gap exists in the travel trajectory L1a, L2a or L3a, depending on a shape of the gap or the like, there may be a case that the gap cannot be got over in the return travel though the gap can be got over in the opposite outward travel. Accordingly, similarly to the outward travel, before starting the travel, the judgment means 27 judges whether the travel should be started or not (step S63), and when it is judged that the travel may be started (step S63, YES), the second vehicle 20 leaves the second point P2 and performs the return travel to the first point P1 reversely along the travel trajectory L1a, L2a or L3a acquired in the outward travel (step S64).

Under the return travel reversely along the travel trajectory L1a, L2a or L3a based on the travel trajectory information D2a of the outward travel, the second vehicle 20 collects information D6 by using the actual position detection means 23, the inclination detection means 24, the image acquisition means 25 and the obstacle detection means 26 (step S65), tests the information D6 and the corresponding information D2 in the travel trajectory information D2a acquired under the outward travel and accumulated in the storage means 21 by comparison, and calculates a parameter value as differential information ΔDa between the information (hereinafter, simply referred to as "differential information ΔDa") (step S66). When the differential information ΔDa is within a permissible range which is a standard whether the travel should be stopped or not) (step S67, YES) and the obstacle detection means 26 does not detect any obstacle (step S68, NO), the travel toward the first point P1 along the travel trajectory L1a, L2a or L3a is continued. When the second vehicle 20 reaches the first point P1 (step S69, YES), acquisition of the information D6 by the actual position detection means 23, the inclination detection means 24 and the image acquisition means 25 is stopped (step S70). Preferably, by the transmission from the transmission reception means 22 to the transmission reception means 12, the purport that the first vehicle 10 reaches the first point P1 is notified to the operator.

<4-1. Case in which Second Vehicle 20 does not Start Return Travel>

At the second point P2, when the judgment means 27 judges that the travel should not be started (step S63, NO), the travel suspension information E4 is transmitted from the transmission reception means 22 to the transmission reception means 12 (step S71). The operator can know the cause that the return travel of the second vehicle 20 is not started from the travel suspension information E4 received by the transmission reception means 12. The operator goes to a point, at which the cause occurs, by the first vehicle 10, solves the problem, and transmits the problem solution information E4a, which notifies the purport that the problem is solved, by the transmission reception means 12. When the transmission reception means 22 receives the problem solution information E4a (step S72, YES) and the judgment means 27 permits the travel start (step S63, YES), the second vehicle 20 leaves the second point P2 so as to perform the return travel reversely along the outward travel trajectory (step S64). The operator grasping the problem solution information E4a may provide means of selection of another route by using the route selection means 16 instead of the solution of the problem (removal of the travel stop cause) (it can be considered that the selection of another route is performed automatically by the second vehicle 20).

Concerning another route, similarly to the outward travel, one of the past travel trajectories of the first vehicle 10 and the second vehicle 20 is selected as an alternative travel route L2b. When the past travel trajectory of the first vehicle 10 is set to the alternative travel route L2b, the return travel follows reversely the past travel trajectory of the first vehicle 10. When any past travel trajectory which can be selected as the alternative travel route L2b is not acquired, the first vehicle 10 moves to the first point P1 prior to the second vehicle 20 and a travel trajectory generated by this movement is set to an alternative travel route L2c. In this case, similarly to the outward travel, the second vehicle 20 travels unmannedly to the first point P1 along the travel trajectory of the first vehicle 1. Concerning the return travel, all the travel trajectories selected except for the travel trajectories L1a, L2a and L3a acquired by the outward travel before starting the travel at the second point P2 is referred to as the alternative travel route L2b.

Accordingly, the alternative travel route L2c is selected, and travel trajectory information D2b thereof and the signal of the travel start command SS are received by the transmission reception means 22, the judgment means 27 judges whether the travel start is permitted or not (step S74), and when it is judged that the travel can be started (step S74, YES), the second vehicle 20 performs the return travel along the alternative travel route L2c (step S75). Under the travel along the alternative travel route L2c, the information D6 is acquired (steps S65, S66) so as to calculate the differential information ΔDa for confirming whether the cause of the travel stop exists or not (in this case, it is calculated by comparison with the alternative travel trajectory information D2b).

<4-2. Case in which Second Vehicle 20 Stops Travel Under Return Travel>

As mentioned above, when a value excessing the permissible range is detected from the differential information ΔDa calculated under the return travel of the second vehicle 20 (step S67, NO) or the obstacle detection means 26 detects an obstacle (step S68, YES), the judgment means 27 judges that the travel cannot be continued and stops the second vehicle 20 there (step S81). Then, the travel stop information E5 including the purport of the travel stop, a position of the travel stop, a cause of the travel stop and the like is transmitted from the transmission reception means 22 to the transmission reception means 12 (step S82) so as to make the operator of the first vehicle 10 recognize the state of travel stop of the second vehicle 20 in the return travel. Based on the information received by the transmission reception means 12, the operator operates the first vehicle 10 and goes to the travel stop position of the second vehicle 20 (otherwise, stops at the travel stop position of the second vehicle 20 in the middle of the return travel of the first vehicle 10 after finishing all the work processes), and when the cause of the travel stop of the second vehicle 20 is removed, a signal of problem solution information D2c including at least a signal of travel start command is transmitted to the second vehicle 20. In the second vehicle 20, when the problem solution information D2c is received (step S83), the judgment means 27 judges whether the travel can be started or not (step S63), and when it is judged that the travel can be started (step S63, YES), the return travel reversely along the travel trajectory L1a, L2a or L3a is started (step S64).

When it is judged that the cause of the travel stop in the certain route cannot be removed based on the information in the travel stop information E5 and alternative travel trajectory L3b is selected by using the route selection means 16 or the like, the operator transmits alternative travel trajectory information D2c thereof. In the second vehicle 20, when the alternative travel trajectory information D2c is received (step S84, YES), the judgment means 27 judges whether the travel can be started or not based on the alternative travel trajectory information D2c (step S85). When it is judged that the travel can be started (step S85, YES), the second vehicle 20 returns to a starting point of the alternative travel trajectory L3b (a meeting point of the travel trajectory L1a, L2a or L3a and the alternative travel trajectory L3b) by backing or U-turn (step S86). When reaching the starting point of the alternative travel trajectory L3b (step S87, YES), the unmanned travel along the alternative travel trajectory L3b is started from the starting point (step S88), and during the travel along the alternative travel trajectory L3b, the information D6 is acquired by using the actual position detection means 23, the inclination detection means 24, the image acquisition means 25 and the obstacle detection means 26 (step S65), and the differential information ΔDa (in this case, the differential information ΔDa between the alternative travel trajectory information D2c and the information D6) is calculated.

Similarly to the alternative travel trajectory L2b, the alternative travel trajectory L3b is selected from the past travel trajectories of the first vehicle 10 and the second vehicle 20 which can be acquired. When any effective past travel trajectory is not stored, the first vehicle 10 performs newly the return travel so as to generate the alternative travel trajectory L3b and the information D2c thereof, and the alternative travel trajectory information D2c is transmitted to the second vehicle 20.

It can be considered that the trajectory of return travel of the second vehicle 20 from the second point P2 to the first point P1 is stored as an alternative travel trajectory of the future return travel from the same second point P2. In this case, by the same reason as that of the case of the travel stop under the outward travel, the information D6 of the return from the travel stop position to the start point of the alternative travel trajectory L3b (step S86) may be deleted. Otherwise, as mentioned above, the information D6 of this period may be stored as information notifying that the cause of the travel stop exists in the route.

INDUSTRIAL APPLICABILITY

It can be considered that the movement system and the work system of the manned work travel vehicle and the unmanned work travel vehicle using wireless communication according to the present invention can be used in various fields and purposes in addition to the disclosed embodiments.

DESCRIPTION OF NOTATIONS 10 first vehicle (manned travel work vehicle (utility vehicle))
20 second vehicle (unmanned travel work vehicle (tractor))
11, 21 storage means
12, 22 transmission reception means
13, 23 actual position detection means
14, 24 inclination detection means
15, 25 image acquisition means
16 route selection means
18 portable information terminal
26 obstacle detection means
27 judgment means
29 calculation means
P1 first point (foothold at non-working time)
P2 second point (work objective position)
L1 travel trajectory (of first vehicle 10)
L1a travel trajectory (of second vehicle 20)
L2 alternative travel route L2a travel trajectory (of second vehicle 20)
L3 alternative travel route
L3a travel trajectory (of second vehicle 20)
L4 travel trajectory (of first vehicle 10)
D1 information (acquired under travel of first vehicle 10)
D1a travel trajectory information (of first vehicle 10)
D2 information (acquired under travel of second vehicle 20)
D2a travel trajectory information (of second vehicle 20)
D3a travel trajectory information
D6 information (acquired under return travel of second vehicle 20)
ΔD differential information (between information D1 and information D2)
ΔDa differential information (between information D6 and information D2)
P3 (P3a, P3b, P3c) processing point
P4 stop position
T process travel route (of first vehicle 10)
W work travel route (of second vehicle 20)

The invention claimed is:

1. A system of movement control of work vehicles having a first vehicle which is a manned travel work vehicle and a second vehicle which is an unmanned travel work vehicle within a boundary of a work area, the system comprising:
a wireless communication system comprising a controller and configured to:
enable transmission of information between the first vehicle and the second vehicle within the boundary of the work area;
transmit, to the second vehicle, travel trajectory information concerning a travel trajectory of the first vehicle and a state of the first vehicle to enable the second vehicle to:
perform unmanned operating travel to an objective position along the travel trajectory of the first vehicle based on the travel trajectory information, and
determine whether the unmanned operating travel of the second vehicle is started or suspended based on the travel trajectory information, and
when the unmanned operating travel of the second vehicle is suspended, transmit travel suspension information associated with a cause of the unmanned operating travel suspension to the first vehicle.

2. The system of movement control of work vehicles according to claim 1,
wherein differential information is calculated from information concerning an actual position acquired by the second vehicle, a state of the second vehicle and a circumference thereof and the travel trajectory information of the first vehicle, and
wherein whether the unmanned operating travel is continued or stopped is judged based on the differential information, and
wherein the wireless communication system is further configured to, when the travel is stopped, transmit travel stop information associated with a travel stop position and a travel stop cause is transmitted to the first vehicle.

3. The system of movement control of work vehicles according to claim 1, wherein the second vehicle is configured to:
acquire alternative travel trajectory information associated with an alternative travel trajectory of the first vehicle or the second vehicle to the objective position and a state thereof in addition to the travel trajectory information, and
select the alternative travel trajectory and perform unmanned operating travel along the selected alternative travel trajectory to the objective position.

4. The system of movement control of work vehicles according to claim 3, wherein the alternative travel trajectory information comprises the alternative travel trajectory of the second vehicle.

5. The system of movement control of work vehicles according to claim 1, wherein a portable information terminal which enables transmission and reception of information by using the wireless communication system is provided in the first vehicle.

6. The system of movement control of work vehicles according to claim 1, wherein:
the travel trajectory of the first vehicle demarcates the boundary of the work area based on the travel trajectory information, and
the second vehicle is configured to:
calculate a work travel route of the second vehicle in the work area, and
perform unmanned work travel along the calculated work travel route.

7. The system of movement control of work vehicles according to claim 6, wherein the second vehicle is further configured to:
calculate one or more processing points in the work travel route,
transmit information associated with the one or more processing points to the first vehicle via the wireless communication system, and
when the second vehicle stops the unmanned operating travel, transmit information associated with a stop position and a cause of the stop to the first vehicle via the wireless communication system.

8. The system of movement control of work vehicles according to claim 1, wherein:
the travel trajectory information comprises:
first position information from a position detection means of the first vehicle;
first inclination information from an inclination detection means of the first vehicle; and
first image information from an image acquisition means of the first vehicle; and
the travel trajectory comprises a first path from an initial position to the objective position.

9. The system of movement control of work vehicles according to claim 8, wherein the second vehicle acquires an unmanned travel trajectory information comprising:
second position information from a position detection means of the second vehicle;
second inclination information from an inclination detection means of the second vehicle; and
second image information from an image acquisition means of the second vehicle.

10. The system of movement control of work vehicles according to claim 9, wherein transmitting travel suspension information when the unmanned operating travel of the second vehicle is suspended comprises:
transmitting a position of the second vehicle along the travel trajectory; and
transmitting an abnormality concerning a differential in the unmanned travel trajectory information and the travel trajectory information.

11. The system of movement control of work vehicles according to claim 10, wherein the abnormality comprises an obstacle which was not present when the first vehicle traveled along the travel trajectory.

12. The system of movement control of work vehicles according to claim 11, wherein the obstacle comprises a fallen tree.

13. The system of movement control of work vehicles according to claim 1, wherein the cause of the unmanned operating travel suspension comprises an obstacle which was not present when the first vehicle traveled along the travel trajectory.

14. A system of movement control of work vehicles having a first vehicle which is a manned travel work vehicle and a second vehicle which is an unmanned travel work vehicle within a boundary of a work area, the system comprising:
a second vehicle comprising a controller configured to:
identify first vehicle travel trajectory information received from the first vehicle, the first travel trajectory information associated with a travel trajectory of the first vehicle and a state of the first vehicle within the boundary of the work area;
perform unmanned operating travel of the second vehicle to a destination point along a travel trajectory of the first vehicle;
record second vehicle travel trajectory information along the travel trajectory of the first vehicle;
compare the second vehicle travel trajectory information to the first vehicle travel trajectory information;
in response to the second vehicle travel trajectory information being outside a permissible range from the first vehicle travel trajectory information, suspend the unmanned operating travel of the second vehicle; and
initiate transmission of travel suspension information associated with a cause of the unmanned operating travel suspension to the first vehicle.

15. The system of movement control of work vehicles according to claim 14, wherein the second vehicle further comprises:
receiving means comprising a terminal and configured to enable communication between a first vehicle and the second vehicle;
a position detection means comprising a GPS device;
an inclination detection means comprising an angle sensor and configured to detect an inclination of the second vehicle;
an image acquisition means comprising at least one digital camera; and
an obstacle detection means comprising a contact sensor.

16. The system of movement control of work vehicles according to claim 15, wherein, in response to the second vehicle being suspended:
the receiving means is configured to acquire alternate travel trajectory information associated with an alternate travel trajectory to the destination point; and
the controller is configured to perform unmanned operating travel of the second vehicle to the destination point along the alternate travel trajectory.

17. A method of using an unmanned work vehicle in a system of movement to control, via a controller, work vehicles including a manned work vehicle and the unmanned work vehicle within a boundary of a work area, the method comprising:
choosing a destination point within the boundary of the work area;
transporting the manned work vehicle to the destination point along a first path;
receiving, from the manned work vehicle, a travel start command, travel trajectory information, and manned operational information of the first path;
traveling autonomously to the destination point along the first path based on the travel trajectory information;
recording unmanned operational information along the first path;
comparing the unmanned operational information to the manned operational information;
suspending travel of the unmanned work vehicle in response to a difference between the unmanned operational information and the manned operational information exceeding a permissible range; and
transmitting travel suspension information associated with a cause of the travel suspension to the manned work vehicle.

18. The method of using an unmanned work vehicle according to claim 17, further comprising:
receiving, from the manned work vehicle, problem solution information and alternative travel trajectory information associated with a second path; and
traveling autonomously to the destination point along the second path based on the alternate travel trajectory information.

* * * * *